US006650877B1

(12) United States Patent
Tarbouriech et al.

(10) Patent No.: US 6,650,877 B1
(45) Date of Patent: Nov. 18, 2003

(54) METHOD AND SYSTEM FOR IDENTIFYING DATA LOCATIONS ASSOCIATED WITH REAL WORLD OBSERVATIONS

(75) Inventors: Philippe Tarbouriech, San Francisco, CA (US); Gilles van Ruymbeke, Menlo Park, CA (US)

(73) Assignee: Microvision, Inc., Bothell, WA (US)

( * ) Notice: Subject to any disclaimer, the term of this patent is extended or adjusted under 35 U.S.C. 154(b) by 0 days.

(21) Appl. No.: 09/559,031

(22) Filed: Apr. 27, 2000

Related U.S. Application Data

(63) Continuation-in-part of application No. 09/303,021, filed on Apr. 30, 1999.

(51) Int. Cl.[7] .................................................. H04Q 7/20
(52) U.S. Cl. ................................... 455/186.1; 455/3.06
(58) Field of Search ............................. 455/45, 186.1, 455/3.05, 161.1, 161.2, 154.1, 180.3, 180.1, 165.1, 185.1, 414, 502, 186.2, 3.01, 3.06, 3.03, 3.04, 418, 419; 709/213, 237, 222, 400; 725/914, 915, 51, 40; 379/207.3, 207.1, 214.01, 190, 192

(56) References Cited

U.S. PATENT DOCUMENTS

| | | | |
|---|---|---|---|
| 4,815,110 A | * | 3/1989 | Benson et al. ............... 370/508 |
| 4,955,070 A | | 9/1990 | Welsh |
| 5,189,630 A | | 2/1993 | Barstow et al. |
| 5,214,792 A | | 5/1993 | Alwadish |
| 5,303,401 A | * | 4/1994 | Duckeck et al. ............ 340/7.48 |
| 5,444,499 A | * | 8/1995 | Saitoh ......................... 348/734 |
| 5,539,635 A | * | 7/1996 | Larson, Jr. ................... 235/375 |
| 5,664,110 A | | 9/1997 | Green et al. |
| 5,703,795 A | | 12/1997 | Mankovitz |
| 5,734,973 A | * | 3/1998 | Honda ........................ 455/184.1 |
| 5,790,958 A | * | 8/1998 | McCoy et al. ............. 455/161.1 |
| 5,794,230 A | | 8/1998 | Horadan et al. |
| 5,819,155 A | | 10/1998 | Worthy |
| 5,890,175 A | | 3/1999 | Wong et al. |
| 5,918,213 A | * | 6/1999 | Bernard et al. ................ 705/26 |
| 5,949,492 A | | 9/1999 | Mankovitz |
| 6,067,562 A | * | 5/2000 | Goldman ..................... 709/206 |
| 6,282,412 B1 | * | 8/2001 | Lyons ...................... 455/161.2 |
| 6,314,577 B1 | * | 11/2001 | Pocock .................. 379/101.01 |

FOREIGN PATENT DOCUMENTS

| | | |
|---|---|---|
| EP | 0 687 083 A1 | 6/1995 |
| FR | 2555383 | 5/1985 |
| WO | WO 91/11062 | 7/1991 |
| WO | WO 97/01137 | 1/1997 |
| WO | WO 98/03923 | 1/1998 |
| WO | WO 98/21664 | 5/1998 |
| WO | WO 99/18518 | 4/1999 |

OTHER PUBLICATIONS

HighPoint Systems, Inc., http://www.highpoint.com, Date unknown.

Acey, Safeway Tests PalmPilot, http://www.nytimes.com/techweb/TW Safewavilot.html, Date unknown.

\* cited by examiner

*Primary Examiner*—Dwayne Bost
*Assistant Examiner*—Jean A Gelin

(57) ABSTRACT

A method and system for identifying data locations or uniform resource locators associated with physical observations in the real world. The method and system includes selecting certain physical parameters based upon an observation of real world objects and events and associating such physical parameters with data locations on the Internet or other computer network. When the real world object is observed or a real world event occurs, physical parameters relating to the object or event are sensed and recorded. These stored physical parameters are then communicated to a database, which returns a data location corresponding to the observed physical parameters. Thus, the present invention allows a user to "click" on objects or events in the real world in order to find data locations related to the objects or events in the on-line world.

8 Claims, 12 Drawing Sheets

METHOD AND SYSTEM FOR IDENTIFYING DATA LOCATIONS ASSOCIATED WITH REAL WORLD OBSERVATIONS

RELATED APPLICATION

The present application is a continuation-in-part of U.S. application Ser. No. 09/303,021, filed Apr. 30, 1999 and entitled "Method and System for Identifying Data Locations Associated with Real World Observations."

FIELD OF THE INVENTION

The present invention relates to a method and system for sensing physical parameters corresponding to an object or event in the physical world and, based on the observed physical parameters, retrieving a data location on a computer network pointing to information associated with the physical world object or event.

BACKGROUND OF THE INVENTION

The increasing use of wide area networks such as the Internet has resulted in an explosion in the provision of on-line services. Computer users can access a vast wealth of information and services by utilizing a wide area network to establish a connection with other computers connected to the network.

The Internet is a global network of millions of computers belonging to various commercial and non-profit entities such as corporations, universities, and research organizations. The computer networks of the Internet are connected by gateways that handle data transfer and conversion of messages from a sending network to the protocols used by a receiving network. The Internet's collection of networks and gateways use the TCP/IP protocol. TCP/IP is an acronym for Transport Control Protocol/Internet Protocol, a software protocol developed by the Department of Defense.

Typically, the computers connected to a wide area network such as the Internet are identified as either servers or clients. A server is a computer that stores files that are available to other computers connected to the network. A client is a computer connected to the network that accesses the files and other resources provided by a server. To obtain information from a server, a client computer makes a request for a file or information located on the server using a specified protocol. Upon receipt of a properly formatted request, the server downloads the file to the client computer.

The World Wide Web is a system of Internet servers using specified Internet protocols and supporting specially formatted documents. The HyperText Transfer Protocol (HTTP) is the underlying protocol used by the World Wide Web. HTTP defines how messages are formatted and transmitted, and what actions Web servers and browsers should take in response to various commands. The other main standard of the World Wide Web is Hyper-Text Markup Language (HTML), which covers how documents and files are formatted and displayed. HTML supports links to other documents, as well as graphics, audio, and video files.

Users access the content contained on the Internet and the World Wide Web with an Internet Browser, which is a software application used to locate and display web pages. Files on a web server are identified by a uniform resource locator. A Uniform Resource Locator ("URL") is the global address of files and other resources on the Internet. The address indicates the protocol being used and specifies the IP address or the domain name where the file or resource is located. Typically, a URL identifies the name of the server and the path to a desired file on the server. For example, a URL for a web server may be constructed as follows: "http://<server>/<filepath>", where <server> identifies the server on which the file is located and <filepath> identifies the path to the file on the server. Thus, with the name of the server and the correct path to a file, a properly formatted URL accesses a desired file on a server connected to the World Wide Web.

As one can imagine, there are myriad documents and files accessible over the Internet. However, as discussed above, retrieving desired information on the Internet requires knowledge of an associated URL. Accordingly, if, for example, a consumer wishes to obtain information about or order a particular company's product on the World Wide Web, she must know the URL (data location) corresponding to that company's web site. Conversely, if a corporation desires the public to visit its web site containing information about its products, it will typically advertise its web site and corresponding URL in television, radio, print or other media. A consumer may then enter this URL, assuming he remembers it, into a browser and access the web site.

When a specific URL or data location is not known, search engines are a way of locating desired information. Typically, a user enters key words or search terms into a search engine, which returns a list of URLs corresponding to web sites or USENET groups where the key words or search terms were found. Often a search engine will return a large list of web sites, through which the user must wade in order to locate the few web sites relevant to his query.

Due in part to the proliferation of commercial web sites, consumers have become accustomed to the notion that there is a corresponding web site for the vast majority of products and services being commercially offered. Yet, as described above, access to a particular web site on the Internet, requires knowledge of the actual URL or access to a search engine. This becomes problematic, however, when there is no immediate access to a computer connected to the Internet. For example, when a radio listener hears a song on the radio and desires more information about it, he must remember the song title and the artist. Later, the listener can enter the song title or the artist as search terms in a typical search engine. Beyond this method, there are no alternative ways of identifying data locations or URLs based upon an observation of a particular product or event. In light of the foregoing, it can be seen that a need exists for alternative methods of identifying URLs or other data locations on a computer network.

SUMMARY OF THE INVENTION

The present invention provides a method and system for identifying data locations or uniform resource locators associated with physical observations in the real world. The method and system includes selecting certain physical parameters based upon an observation of real world objects and events and associating such physical parameters with data locations on the Internet or other computer network. When the real world object is observed or a real world event occurs, physical parameters relating to the object or event are sensed and recorded. These stored physical parameters are then communicated to a database, which returns a data location corresponding to the observed physical parameters. Thus, the present invention allows a user to use an appropriate sensing device to merely mark or key in on objects or events in the real world in order to find data locations related to the objects or events in the on-line world.

In a preferred embodiment of the system of the invention, one observed physical parameter is the channel or carrier frequency of a broadcast. The system includes a means for sensing the channel or carrier frequency of the broadcast. As set forth in more detail below, the means for identifying may be a remote device or "clicker" that uses a chirp signal to identify the channel or carrier frequency of the broadcast. The sensing unit may also be a hand-held, laptop, desktop, or other computer programmed to contain a list of available broadcasts that can be selected by the user. The system further includes a computer database having stored associations between these physical parameters (here, the channel or frequency of the broadcast) and one or more data locations, uniform resource locators, or Internet addresses. Thus, when the sensing means identifies and provides the channel of a broadcast, the computer database selects the corresponding uniform resource locator, Internet address or other data location. The system thus enables the identification and selection of an Internet address containing information corresponding to the broadcast, even though neither the broadcast nor the user provides an explicit Internet address.

In other preferred embodiments, the sensing means also includes a clock or other means for identifying the time, so that the physical observation may include a set of physical parameters including not only the channel of the broadcast, but also the time of the broadcast. Furthermore, the sensing means may include computer memory or other storage means for storing the channel and time so that these physical parameters may be provided to the computer database at a later time. Alternatively, the memory may store the Internet address provided by the database.

One embodiment of the present invention includes a "clicker" or sensing unit for sensing physical parameters associated with the operation of a radio receiver. In one embodiment, the physical parameters include the frequency to which the radio receiver is tuned. The clicker includes a transmitter for transmitting a chirp signal to the radio receiver during a chirp transmission time. A chirp signal is an audio signal modulated at a range of carrier frequencies during a chirp transmission time in a predetermined manner. The carrier frequency of the chirp signal varies over a range that includes the possible channels to which the receiver may be tuned. For example, in the FM radio frequency band, the chirp signal may vary from about 88 to 108 megahertz. The clicker also includes a microphone for receiving the audio output of the radio receiver. When the frequency of the chirp signal enters the range of the broadcast channel to which the radio receiver is tuned, the radio receiver receives and processes the chirp signal, thereby producing a corresponding output. The chirp receiver detects the audio output of the radio receiver. The clicker also includes a detector coupled to the chirp receiver for generating a detector signal when the detector detects the audio output corresponding to the chirp signal. Accordingly, the frequency of the chirp signal at which the detector signal is generated identifies the channel or frequency to which the radio receiver is tuned. According to the present invention, a listener to a radio broadcast on a radio receiver may use the clicker to identify the channel of the broadcast by pressing a button on the clicker to initiate a chirp signal. The clicker then operates as discussed above to identify the frequency to which the radio receiver is tuned.

In yet other embodiments, the clicker includes the ability to identify and record other concurrent physical parameters, such as the time when the clicker or chirp signal is activated. For example, the clicker may include a real-time clock that provides a clock signal corresponding to the time the listener presses the clicker to initiate the chirp signal. Preferred embodiments of the clicker also include memory to store the channel or frequency of the broadcast and the time the listener activated the chirp signal, as well as means for transmitting the channel and time to the database of the present invention.

Other embodiments of the clicker for use in connection with a radio receiver include a "passive" sensing mechanism. The clicker of this embodiment includes a transducer for receiving the output of a radio receiver. The clicker also includes a first receiver for receiving modulated radio signals and a circuit for demodulating the radio signal into a demodulated signal with respect to a range of frequencies. The clicker further includes a detector for detecting a correlation between the audio output of the radio as provided by the transducer and the second demodulated signal processed by the demodulating circuit or radio receiver.

One preferred embodiment of the sensing unit of the present invention utilizes both the active and passive frequency detection techniques discussed above. In one such embodiment, the sensing unit, when activated, first operates in either the active or passive mode to detect the frequency to which the monitored broadcast receiver is tuned and employs the alternate mode if no frequency was detected. Other embodiments of the sensing unit also include the ability to detect the user's geographic location based on the frequency spectrum signature of the broadcast band in that region.

The database corresponding to the clicker described above may include Internet addresses or other data locations specific to a particular channel or frequency and a range of times. For example, the listener may become interested in the subject matter of a particular radio advertisement broadcast on a radio channel. According to the invention, the listener activates the clicker, which identifies and stores in memory the frequency to which the radio receiver is tuned and the time the clicker was activated. This information is transmitted to the database, as more fully described below, to identify the Internet address associated with the observed broadcast frequency and time and, hence, the radio advertisement. Thus, an Internet address associated with the time and channel of the broadcast may be determined even though access to the Internet is not available at the time of the broadcast and even though no Internet address is given. Moreover, the device described above allows the listener to essentially perform a search of the Internet without articulating a query and entering it into a search engine.

One skilled in the art will readily recognize that other embodiments of the invention for use in other contexts are possible. For example, the physical observation may include physical parameters such as geographical location, sound, voice, image, bar code or other event. Furthermore, the identifying means may include a telephone, television remote control unit, a portable wireless device, or task bar application on a computer.

DETAILED DESCRIPTION OF THE INVENTION

Figure 1:
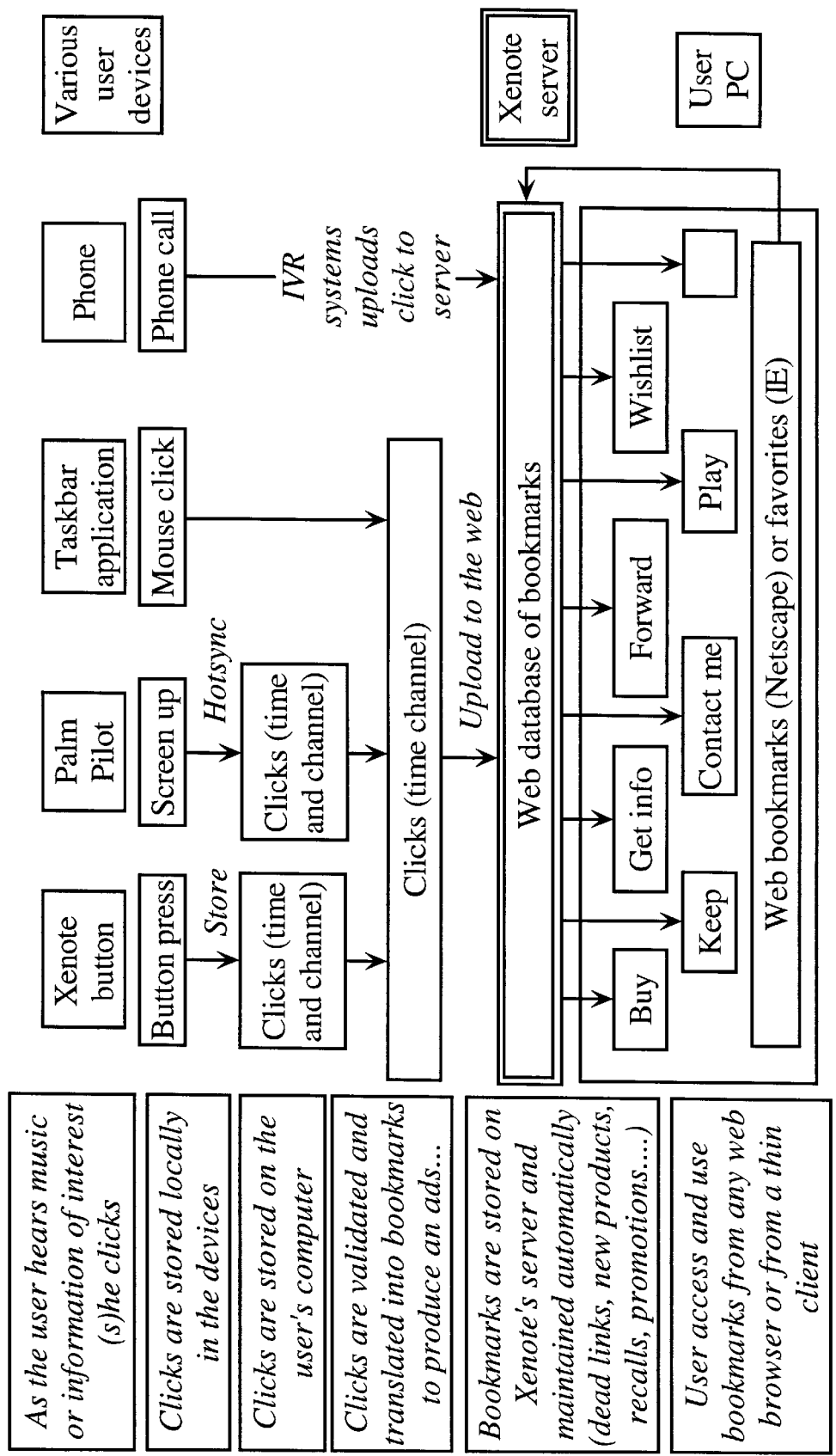
FIG. 1 is a flow chart diagram illustrating several embodiments of the present invention for use in the radio broadcast context.

As discussed above, the present invention provides methods and apparatuses for identifying a data location based upon physical observations in the real world. The method and system generally include identifying one or more physical parameters corresponding to physical observations of real world objects or events and associating such physical parameters with data locations. Another aspect of the present invention identifies data locations based upon physical observations. The method of this aspect of the present invention generally comprises sensing physical parameters associated with physical objects or events and transmitting the observed physical parameters to a database, which includes associations between these physical parameters and one or more data locations.

The present invention is applicable to the radio broadcast context. According to the invention, a radio listener is provided with a frequency sensing unit, which the listener activates when he/she hears a song or advertisement that is of interest. The sensing unit observes the frequency to which the radio is tuned. In preferred form, the sensing unit also observes the time the listener activated the sensing unit. The sensing unit is then operably connected to a database server of the present invention such that it transmits the observed physical parameters for identification of a data location or URL.

The database according to this embodiment of the present invention includes a list of data locations or URLs which relate to certain radio broadcasts. These data locations or URLs, for example, may point to the web site of a recording artist or a record label. The data location may also point to the web site of a corporation that advertises over a particular radio station. Associated with each of these data locations are the physical parameters of broadcast frequency and time. More specifically, the database of the present invention is arranged such that certain physical parameters or ranges of physical parameters correspond to each data location. For example, a particular data location pointing to a recording artist will have associated with it the frequency of the radio broadcast and the time(s) during which one or more of his songs was played. Therefore, when a listener hears that recording artist or song on the radio and desires more information relating to it, he simply activates the sensing unit. The sensing unit senses and stores the frequency of the broadcast and time of activation. This information is transmitted to the database of the present invention, which identifies a data location and transmits the data location to the listener. In this manner, the listener has gathered physical parameters from the real world off-line and subsequently used the physical parameters to search for information corresponding to these physical parameters on the Internet. Furthermore, unlike prior art search engines, the listener has performed a search without ever articulating any search terms. Additionally, the search terms used by the listener comprised physical parameters (time and frequency, in this circumstance) corresponding to the occurrence of a song in the real world. Such search terms would be meaningless to prior art searching techniques and systems.

Figure 5:
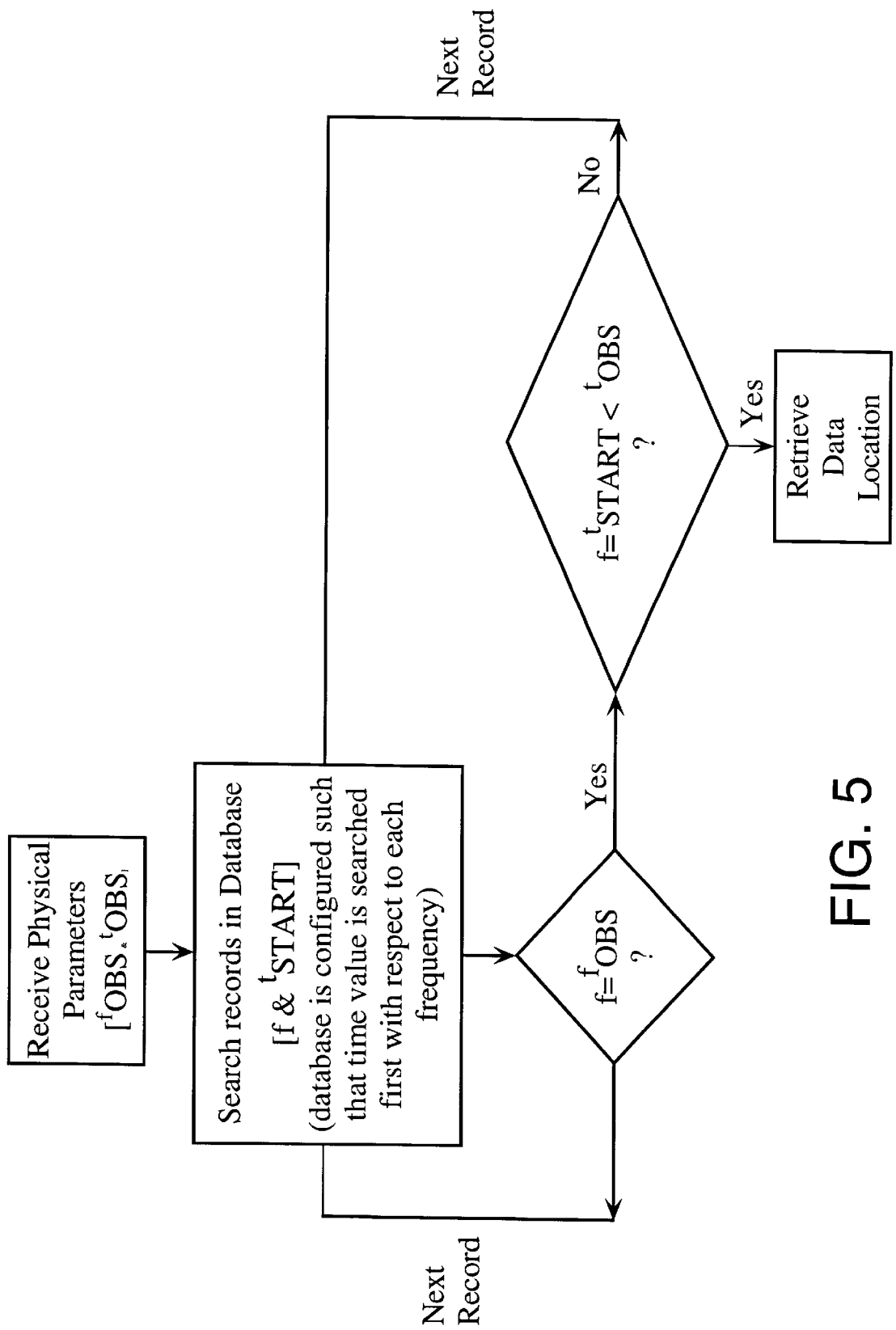
FIG. 5 is a flow chart diagram illustrating the general process steps performed by a first preferred server of the present invention as applied to the radio broadcasting context.

In one preferred embodiment, the database is arranged into a series of records each having four fields. The four fields include 1) the radio station or broadcast frequency, 2) the name of the song or advertisement, 3) the start time of the song or advertisement, and 4) the artist or entity associated with the song or advertisement and a data location. Other preferred databases include a fifth field designating the type of item stored in the record, i.e., whether the record represented a song or an advertisement. In a preferred form, the records of the database are arranged such that the record with the latest start time value with respect to each broadcast frequency is scanned first. Therefore, as illustrated in FIG. 5, when the server is presented with a broadcast frequency/radio station and a time, it scans the database for the most recent record whose frequency/radio station matches the query and whose start time is anterior to the time presented by the query. If the server finds a record matching the user's query, it returns at least one data location or URL associated with these physical parameters.

Delivery of the data locations can be accomplished in a variety of ways. The data locations can be delivered via e-mail, fax, or even regular mail or phone. The data location may also be delivered as part of a HTML document and accessed by the user's Internet browser. The data location may also be delivered as an Internet browser bookmark. The data location may further be stored in a user-specific account file on a server connected to the Internet. A user may access the account using an Internet browser and click on the data location to access the corresponding web site.

The sensing unit for use in the radio broadcasting example described above may comprise any suitable unit for recording a frequency and an activation time. FIG. 1 illustrates some of the methods and systems for capturing physical parameters associated with radio broadcasts and identifying associated data locations. As more fully described below, the sensing unit could observe the frequency to which the listener's radio is tuned. In other embodiments, the sensing unit is a hand-held computer programmed to display a listener's favorite radio stations. When the listener hears something that is of interest, he simply taps the screen on the icon representing the radio station to which he is listening. The sensing unit is also incorporated into a general purpose computer as a task bar application. The present invention also contemplates the use of a telephone as a sensing unit.

A. User Access to Database

In one embodiment, users access physical parameter/data location database 54 according to the present invention by accessing server 52 of data location site 50 via client computers 60. In one embodiment, computer network 40 is the Internet; however, computer network 40 can be any suitable local or wide area computer network. In addition, computer network 40 can be an electronic, optical or wireless network. In the embodiment shown in FIG. 6, data location site comprises server 52 operably connected to computer network 40. Server 52, in one embodiment, is a web server that receives requests from users and transmits data in return. Data location site 50, in one embodiment, further comprises physical parameter/data location database 54 and user account database 56.

1. User Accounts a. Unique User ID for log in

In one embodiment, users of the system each have an account identified by a unique user identification. In one form, users access accounts stored in user account database 56 operably connected to computer network 40 via server 52. In one embodiment, user account database 56 stores unique user identifications and a password for each user of the system.

In one embodiment, users access data location site 50 via client computers 60. In one embodiment, browser 62 on client computer 60 includes a browser plug-in or ActiveX component that establishes the communications link to data location site 50. In one embodiment, users log in to data location site 50 by transmitting a user identification and physical parameter data. In one embodiment, users log in to data location site 50 by transmitting physical parameter stored on sensing unit 70 to data location site 50. In one embodiment, the sensing units according to the present invention store and transmit the user's unique identification to data location site 50 along with physical parameter data via client computer 60. In another embodiment, sensing unit 70 stores and transmits a unique sensing unit identification or serial number instead of the user's identification. According to this embodiment, user account database 56 stores the sensing unit identification in association with the account identification corresponding to the user of the sensing unit. In this form, server 52 identifies the user by retrieving the account identification corresponding to the transmitted sensing unit identification from user account database 56.

The connection between sensing unit 70 and computer 60 can be a physical connection or a wireless connection. In one embodiment, sensing unit 70 physically connects to client computer 60 via a serial or parallel port. In another embodiment, sensing unit 70 includes an infrared transmitter which transmits data to client computer 60 equipped with its own infrared detector. Of course, any other suitable wireless communication method can be used.

In another embodiment, sensing unit 70 directly accesses data location site 50. For example and in one embodiment, sensing unit 70 includes a Dual Tone Multiple Frequency (DTMF) generator allowing for transmission of user identifications and physical parameter data over telephone lines. In one form, sensing unit 70 further stores the phone number corresponding to data location site 50 and, when activated, emits the DTMF tones corresponding to the phone number to establish a connection with data location site 50. When a connection is established, sensing unit 70 transmits a user identification and observed physical parameter data.

b. Monitoring Agent

As discussed above, observed physical parameter data is transmitted and used to retrieve a corresponding data location, if any. In one embodiment, when a user transmits physical parameter data, server 52 accesses database 54 to retrieve a data location and transmits the data location associated with the physical parameter data to the user. In one embodiment, data location site 50 provides the user the option to save the data location. In one embodiment, the data location is saved as a bookmark and stored locally on client computer 60. In another embodiment, the data location is stored in user account database 56 in association with the user's account identification. Thereafter, a user gains access to the stored data locations by accessing his or her account.

In another embodiment, data location site 50 includes a monitoring agent that searches for additional data locations based on the data locations stored by the user. In one form, these additional data locations are presented to the user at a subsequent log-in. In another embodiment, the monitoring agent filters data transmitted to it and stores data locations that may be of interest to the user based on the data locations stored in the user's account. For example and in one embodiment, the monitoring agent is configured to receive lists of data locations corresponding to concert events. In one form, the monitoring agent filters the list against the data locations stored in a user account (bookmarks) and saves those data locations in the user account that correspond or relate to those bookmarks.

2. Encryption of Physical Parameter Data

In one embodiment, data transmitted to data location site 50 is encrypted. In one embodiment, sensing unit 70 encrypts physical parameter data and stores such data in memory. In one embodiment, sensing unit 70 encrypts the data with a unique key comprising a string of random bits. As discussed above, the encrypted physical parameter data is transmitted with the user's account identification to data location site 50. In one form, user account database 56 stores the encryption key of each sensing unit in association with the user's account identification and/or the sensing unit identification. Accordingly, data location site 50 can use the associated encryption key to decrypt the physical parameter data and retrieve corresponding data locations.

B. Physical Parameter Sensing Units

1. Active Frequency Detection

Figure 2:
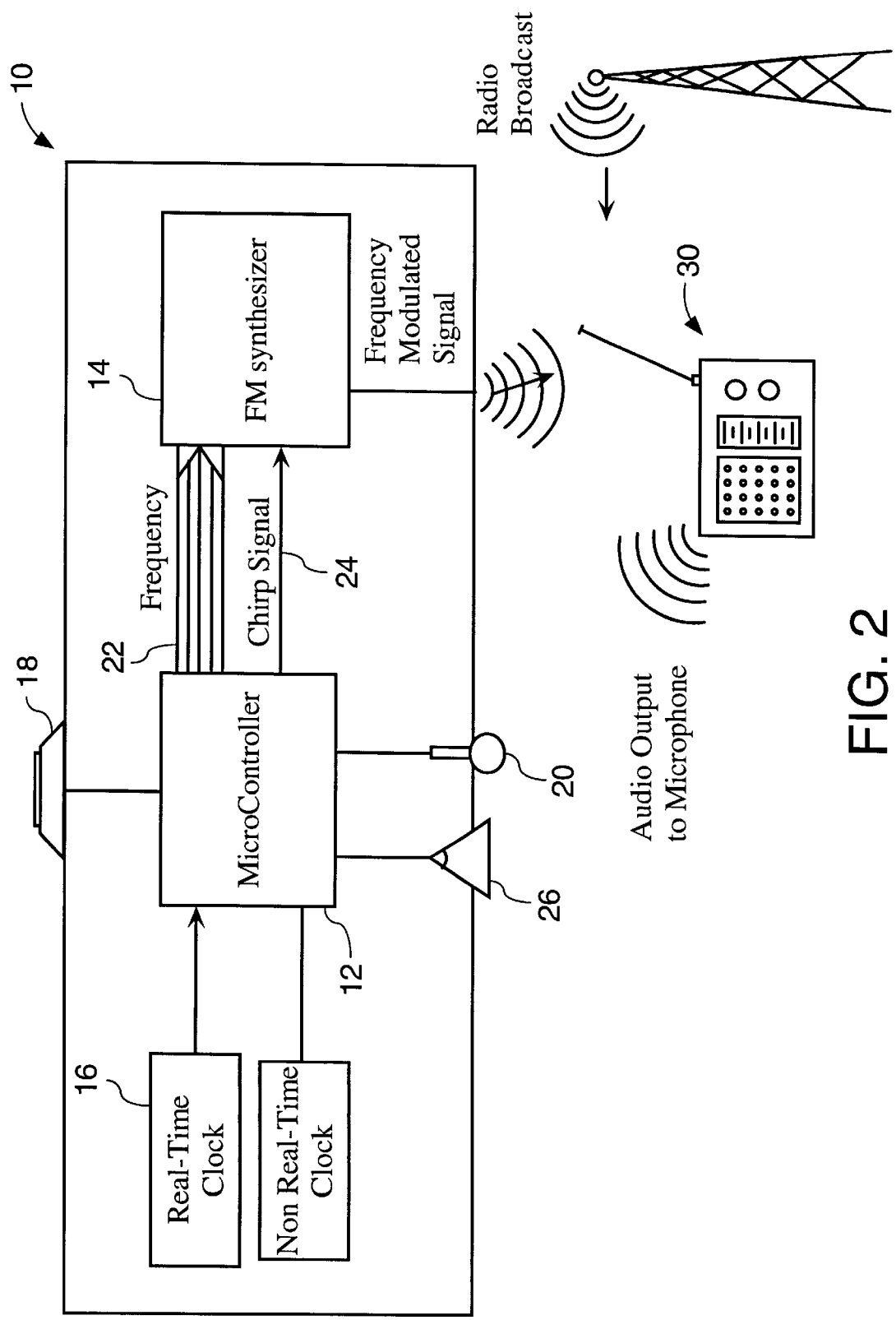
FIG. 2 is a functional block diagram of a first preferred sensing unit for identifying the frequency to which a radio receiver is tuned.

In some preferred embodiments, the sensing unit itself captures the frequency of the broadcast. More specifically and in one preferred embodiment, the sensing unit, when activated, emits a chirp signal over a range of frequencies and monitors the output of the radio receiver to detect the frequency to which the radio receiver is tuned. As shown in FIG. 2, a first preferred sensing unit 10 generally comprises microcontroller 12, frequency synthesizer 14, real-time clock 16, activation button 18, and microphone 20. Sensing unit 10 further includes a suitable power unit, such as a battery (not shown).

Microcontroller 12 includes frequency bus 22 and signal bus 24, both of which connect to frequency synthesizer 14. Microcontroller 12 sends a carrier frequency over frequency bus 22 and a chirp signal over signal bus 24 to frequency synthesizer 14. As is conventional in the art, frequency synthesizer 14 emits a chirp signal over the carrier frequency specified by microcontroller 12. Frequency synthesizer 14 can be any tunable modulator known in the art. In the first preferred embodiment, sensing unit 10 works in conjunction with a conventional FM radio receiver. Accordingly, frequency synthesizer 14 is a tunable frequency modulator.

As alluded to above, sensing unit 10 emits a chirp signal over a range of frequencies to detect the frequency to which the listener's radio is tuned. In a preferred form, the listener activates sensing unit 10 by depressing button 18. In one embodiment, microcontroller 12 stores in memory the time value from real-time clock 16. Microcontroller 12 then starts at the lowest carrier frequency in the FM radio band (about 88 megahertz) and directs frequency synthesizer 14 to emit a chirp signal. Microcontroller 12 is then programmed to wait for a predetermined amount of time. If the listener's radio 30 is tuned to this frequency, its audio output will correspond to the chirp signal. Microphone 20 senses the audio output of radio 30 thereby allowing microcontroller 12 to detect a correspondence between the audio output of radio 30 and the chirp signal. If, after the predetermined amount of time, microcontroller 12 detects no correlation, microcontroller steps the carrier frequency up to the next possible carrier frequency according to the frequency spacing of the particular radio band and directs frequency synthesizer 14 to emit another chirp signal. This process is repeated until microcontroller 12 detects the chirp signal in the audio output of radio 30. When a correlation is detected, microcontroller 12 stores the corresponding carrier frequency in association with the stored time value in memory.

The chirp signal may comprise any suitable signal. In the radio context, the frequency of the chirp signal is limited by the bandwidth of each channel. In preferred form, the chirp signal is a tone having a primary frequency between about 400 to 3000 Hz. The tone is preferably pleasing to the ear as it is within the audible range. The duration of the chirp signal, in one preferred embodiment, is about 10 milliseconds. In addition, microcontroller 12 is programmed with a delay of a 10 millisecond delay to allow for recognition of the chirp signal in the audio output of the radio. Of course, the chirp signal duration and delay between chirp signals provided above are merely examples and are only limited by the constraints of the hardware and software being used, and the propagation time required for the audio output of radio 30 to reach microphone 20. In one embodiment, the delays may configured such that sensing unit 10 is already transmitting the chirp signal on another carrier frequency, when the sound of the chirp signal (demodulated and output by the radio receiver) is still traveling through the air to the microphone 20 and actually detected by sensing unit 10. In one embodiment, when the chirp signal is detected, microcontroller 12 steps back slowly (in one embodiment, by delaying longer between chirp signal transmissions) through the previous carrier frequencies to confirm the "hit" and precisely validates the carrier frequency. Furthermore, in the case of sensing a frequency in the FM band, the strength or power of the chirp signal emitted from sensing unit 10 must be sufficient to "overpower" the radio signal of the broadcast station to which the FM receiver is tuned.

In addition, microcontroller 12 can be programmed to reduce the time during which it seeks for the desired frequency. In one embodiment, microcontroller 12 is programmed to store the carrier frequency of the listener's favorite radio stations and to start with these frequencies before stepping through the entire frequency band. In other embodiments, sensing unit takes advantage of the side bands in the power spectra of the chirp signal. In this embodiment, microcontroller 12 begins with the next-to-lowest frequency in the radio band and steps through every two possible carrier frequencies. Of course, the power spectra of the chirp signal must have sufficient power in the sidebands to overpower the radio broadcast signal. If microcontroller detects a correspondence between the audio output of radio 30 and the chirp signal, it steps the carrier frequency down or up to seek a stronger radio output signal.

Figure 6:
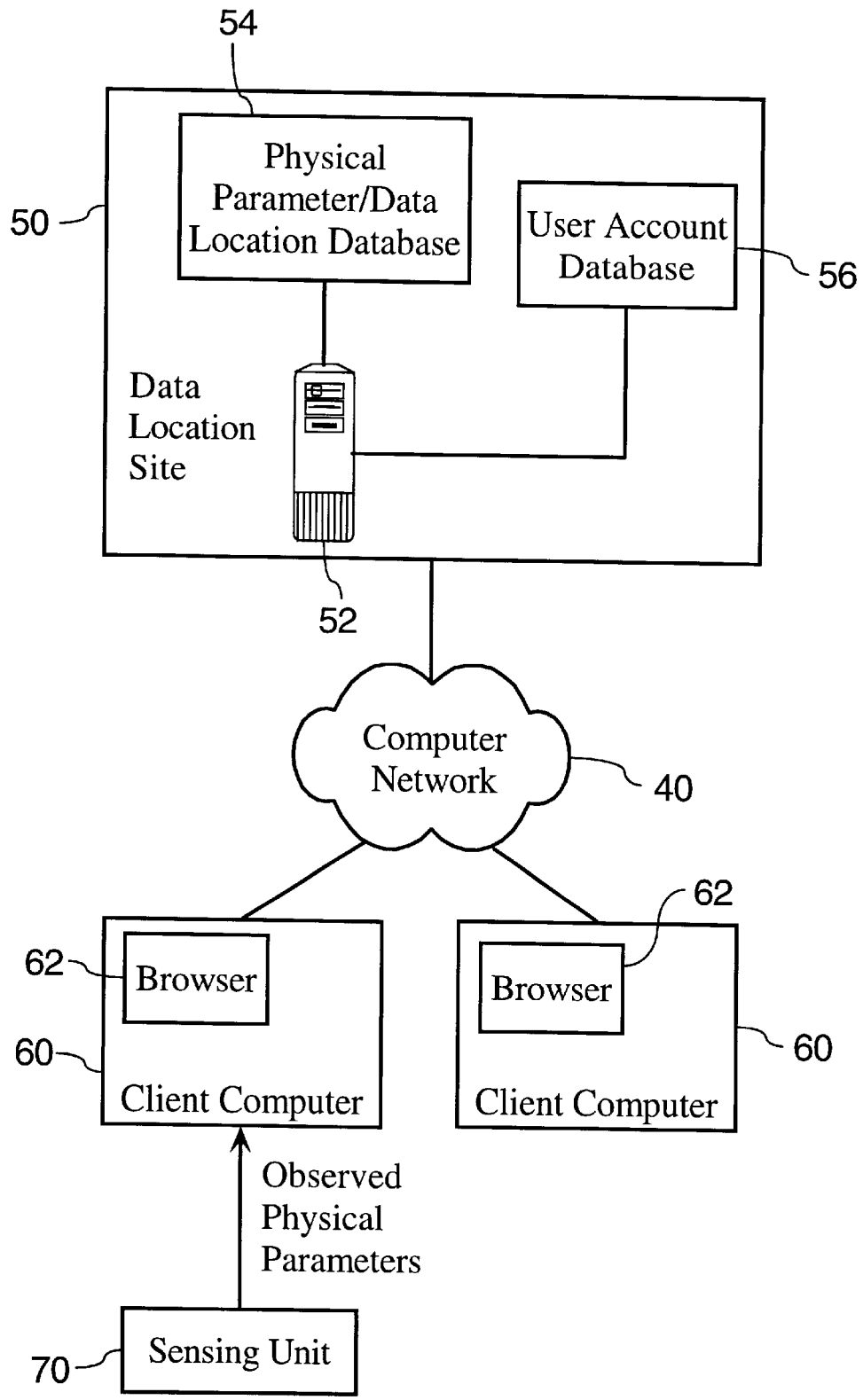
FIG. 6 is a functional block diagram illustrating an embodiment of the system of the present invention.

Sensing unit 10 also includes a means for transmitting stored physical parameters to a user's computer or directly to the server of the present invention. FIG. 6 illustrates the system of the present invention where stored physical parameters are transmitted to a client computer connected to the Internet. The client computer accesses the server of the present invention and transmits a data location request. In the first preferred embodiment, sensing unit 10 includes speaker 26 for transmitting the stored physical parameters to the listener's computer. Microcontroller 12 is programmed to distinguish between a short depression of button 18 and a long depression. A short depression of button 18 causes activation of sensing unit 10 to detect and store a frequency and activation time as described above. A long depression of button 18 causes transmission of stored physical parameters through speaker 26. The microphone input of the listener's computer receives the audio output of microphone 26. The listener's computer is programmed to store the data and to access the database of the present invention to identify a data location or URL that corresponds to the observed physical parameters. Of course, any suitable data transmission means could be used, including but not limited to infrared devices and hard-wired connections.

The listener's computer can be any conventional personal computer known in the art. In one preferred embodiment, the listener's computer is connected to the Internet via a dial-up connection or through a network line. Such communication could also be wireless. The listener's computer is further programmed, as discussed above, to receive at a standard microphone input the audio signal emitted by the sensing unit 10 and to transmit these observed physical parameters to the database of the present invention. In other embodiments, the listener's computer is configured to receive physical parameter data through other input/output ports, such as audio line in, microphone in, USB port, serial port or parallel port. In other preferred embodiments, the database of the present invention is not connected to the Internet. In one embodiment, the protocol for audio communication of physical parameter data between the sensing unit and the listener's computer is RS 232. In one embodiment, the listener's computer includes appropriate communications software and a modem to access the database. In either of these embodiments, the listener's computer may also be configured to transmit a user identification number and password before access to the database is permitted.

Sensing unit 10 can also communicate directly to the database of the present invention. In this embodiment, the listener directly dials the server and, when prompted, depresses button 18 to transmit the stored physical parameters to the server through speaker 26 to the microphone in the telephone handset. In this embodiment, sensing unit 10 could also be configured to transmit a user identification number and password along with the stored physical parameters. Upon verification of the users identification and password, the server uses the stored physical parameters to search the database for associated data locations or URLs. The server can then send any identified data locations to the user's e-mail account or back to the sensing unit.

Sensing unit 10 can be incorporated into a variety of devices. For example, sensing unit 10 comprises a stand-alone unit and is small enough to be used as a key chain similar to keyless remote systems for automobiles. Sensing unit 10 can also be incorporated as an additional feature of a common hand-held or other portable computer.

Figure 7:
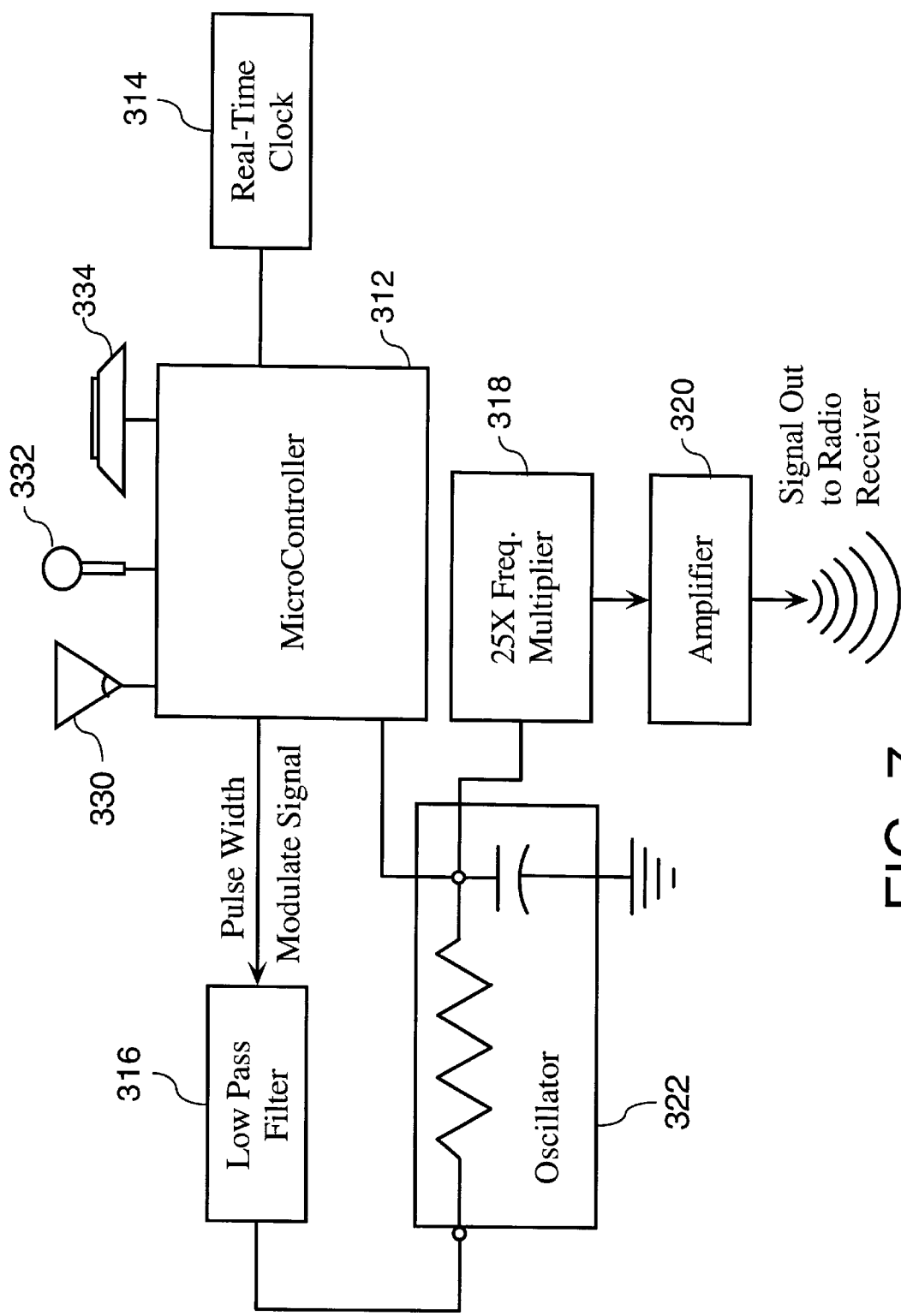
FIG. 7 illustrates a third preferred sensing unit for identifying the frequency to which a radio receiver is tuned.

In addition, FIG. 7 shows another embodiment of the sensing unit of the present invention. The embodiment of FIG. 7 transmits a chirp signal to the listener's radio receiver as in the first preferred embodiment, but includes different frequency modulation means. In one embodiment, the sensing unit comprises microcontroller 312, real-time clock 314, low-pass filter 316, multiplier 318, amplifier 320 and oscillator 322. Real-time clock 314 keeps accurate track of time based on the oscillation of a 32.567 KHz quartz, as is conventional in the art Oscillator 322, in one embodiment, is an outside resistor-capacitor circuit, that generates a clock signal for microcontroller 312, as is standard in the art However, unlike prior art devices, the reference voltage for oscillator 322 is the output of low-pass filter 316, which filters a pulse-width modulated signal from microcontroller 312 to extract the average voltage of the signal over its period. Accordingly, a signal having a larger duty cycle yields a higher output voltage from low-pass filter 316. Therefore, as one skilled in the art will recognize, the frequency of the clock signal provided to microcontroller 312 depends upon the duty cycle of the signal from microcontroller 312.

The signal output from oscillator 322 is also provided to multiplier 318, which multiplies the frequency of the signal to achieve the desired result. In one embodiment, oscillator 322 is configured to run at a predetermined range of frequencies including 4 megahertz. Therefore, if the oscillator output frequency is 4 megahertz, for example, 25-times frequency multiplication achieves a signal having a frequency of about 100 megahertz, which lies within the FM radio band. Of course, different frequencies are achieved by varying the output frequency of oscillator 322. As one skilled in the art will recognize, other clock speed and frequency multiplication parameters can be applied. In one embodiment, this multiplication occurs in two stages of 5-times multiplication to reduce the constraints and costs of the filters used for multiplication. Each multiplication stage involves filtering for the fifth harmonic of the signal. In one embodiment, a Schmitt trigger is used to condition the signal output of oscillator 322 and achieve a signal having a square waveform in order to maximize the power in the harmonics of the signal. The fifth harmonic of the square wave signal is filtered in a first multiplication stage. In the second multiplication stage, a second filter isolates the fifth harmonic of the waveform resulting from the first multiplication to achieve the desired frequency multiplication.

Amplifier 320 amplifies this frequency-multiplied signal and transmits it to the listener's radio. Thus, similar to that described above, the duty cycle of the signal provided by microcontroller 312 to low-pass filter 316 also controls the frequency of the signal ultimately transmitted to the listener's radio receiver. For each carrier frequency there exists a corresponding pulse width or duty cycle. Accordingly, to transmit a chirp signal (e.g., a 400-Hz tone) over a particular carrier frequency, microcontroller 312 modulates the pulse-width or duty cycle of the signal corresponding to a particular carrier frequency according to the 400 Hz chirp signal.

Additionally, identifying the exact speed of microcontroller 312 requires certain calibration steps. This involves running a program and timing it using real-time clock 314. Real-time clock 314 interrupts the program after a specified amount of time (1 second for example). The speed of the processor is derived by counting how many instructions the processor executed in the specified time. In one embodiment, this count is simplified by using a program whose sole function is to increment a counter. This processor speed is then multiplied as appropriate to yield the resulting carrier frequency. In one preferred embodiment, the ratio of the frequency of oscillator 322 to the internal clock speed of microcontroller 312 is 1:4. Therefore, the processor speed is divided by four and multiplied by twenty-five to yield the resulting carrier frequency. The device is calibrated by running the processor at a low speed (88 megahertz/25, for example) and a relatively high speed (108 megahertz/25m) and then comparing the observed frequencies with the intended frequencies.

Other than as set forth above, the above-described embodiment operates much like the first preferred embodiment. Depression of button 334 activates microcontroller 312 which then outputs a pulse-width modulated signal corresponding to the lowest carrier frequency in the FM radio band. Microcontroller 312 monitors the output of the listener's radio through microphone 332. If the chirp signal is detected, the carrier frequency of the chirp signal is measured by timing the processor execution speed as described above. The corresponding frequency and time of activation are then stored in memory. These stored physical parameters are transmitted to the listener's computer through speaker 330, as with the first preferred embodiment. If the chirp signal is not detected, microcontroller 312 increases the pulse-width of the signal provided to low-pass filter 316 such that the signal corresponds to the next possible carrier frequency. This process described above is repeated until the chirp signal is detected in the audio output of the listener's radio.

2. Passive Frequency Detection

Figure 3:
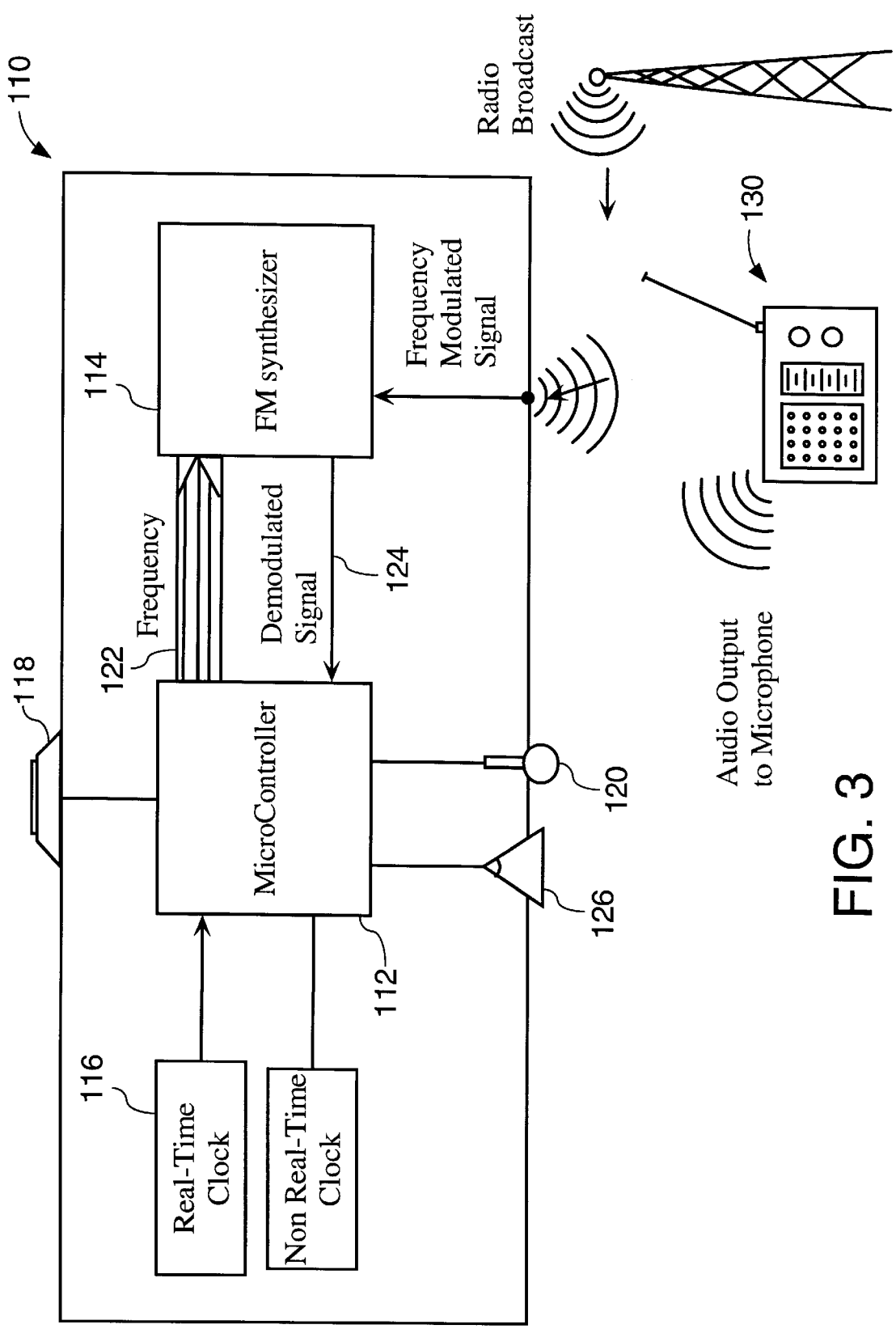
FIG. 3 is a functional block diagram of a second preferred sensing unit for identifying the frequency to which a radio receiver is tuned.

FIG. 3 illustrates a second embodiment of a frequency sensing unit of the present invention. The second preferred sensing unit, rather than emitting a chirp signal, demodulates radio signals with respect to a range of frequencies and compares the demodulated signal to the observed audio output of the radio receiver. As FIG. 3 shows, sensing unit 110 generally comprises microcontroller 112, receiver 114, real-time clock 116, activation button 118, and microphone 120.

As described above, when the listener desires more information relating to a particular broadcast, she presses activation button 118 to energize sensing unit 110. Microcontroller 112 through data bus 122 tunes receiver 114 to the lowest carrier frequency in the FM band. Receiver 114 delivers the demodulated signal to microcontroller 112. Microcontroller 112 detects the correlation, if any, between the audio output of radio 130 as captured by microphone 120 and the demodulated signal delivered by receiver 114. If no correlation is detected, microcontroller 112 tunes receiver 114 to the next available carrier frequency and compares the demodulated signal to the audio output of radio 130. This process is repeated until microcontroller 112 detects the requisite correlation. When the correlation is detected, microcontroller 112 stores the frequency at which the correlation was detected and the time, as provided by real-time clock 116, such correlation was detected. This information is then communicated to the listener's computer through speaker 126 as discussed above.

3. Combination of Active and Passive Frequency Detection

One embodiment of the frequency sensing unit according to the present invention combines the active and passive frequency detection techniques discussed above. It has been found that when a broadcast signal is weak (e.g., because the user is far away from the broadcast transmitter), the passive frequency detection unit, in some embodiments, does not adequately pick up the broadcast signal for purposes of audio matching (i.e., comparing the audio signal detected by receiver 114 of sensing unit 110 to the audio output of the monitored receiver as detected by microphone 120 (see FIG. 3)). In addition, when the broadcast signal is strong, the active frequency detection unit (see FIG. 2), due to FCC regulations, cannot output a chirp signal of sufficient strength to overpower the program broadcast signal. Therefore, in some embodiments, a combination of the active and passive units is required to ensure that the target frequency is detected.

Figure 8:
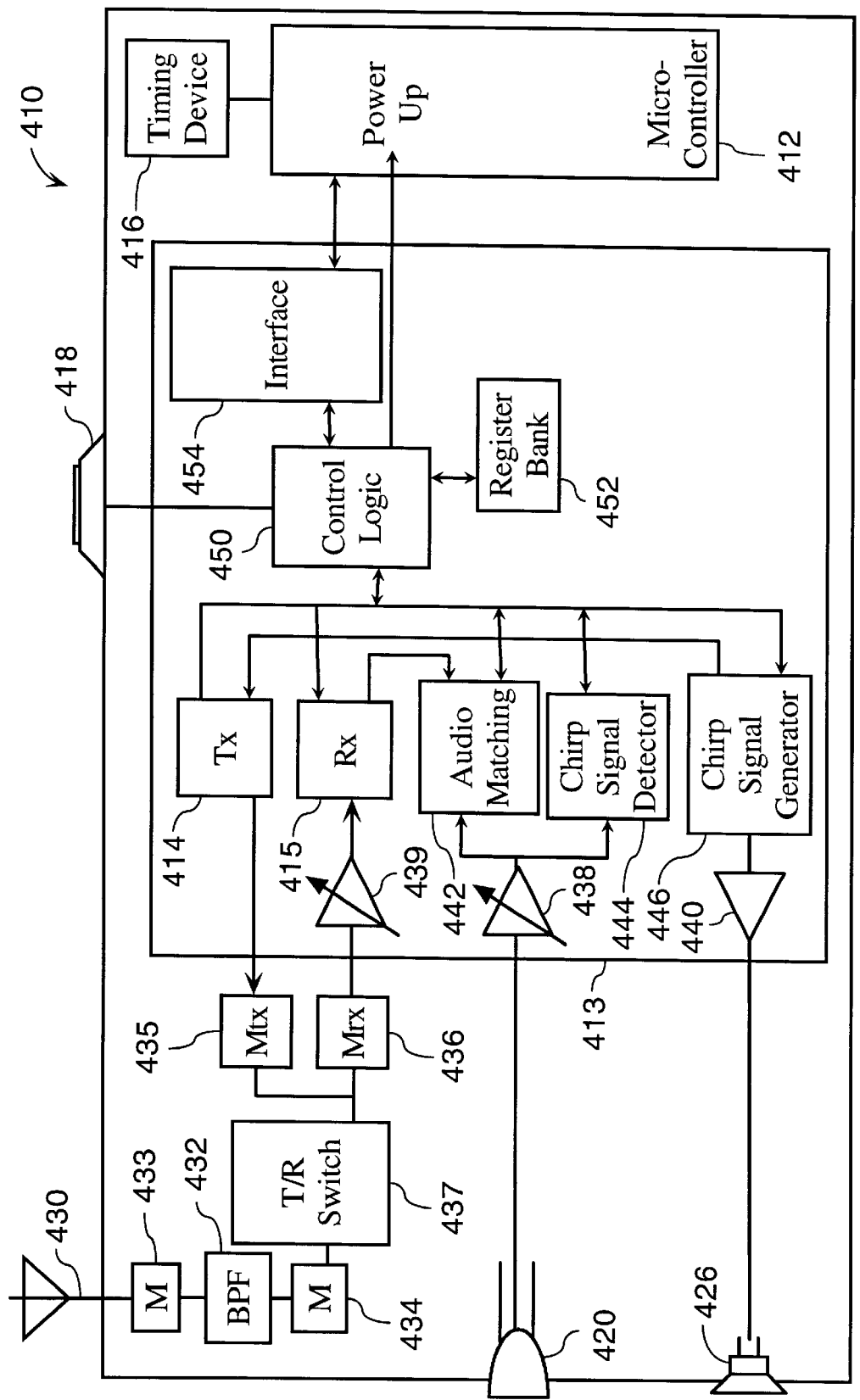
FIG. 8 is a functional block diagram of a fourth preferred sensing unit for identifying the frequency to which a radio receiver is tuned.

FIG. 8 is a functional block diagram illustrating an embodiment of the sensing unit that includes both active and passive frequency detection. As FIG. 8 shows, sensing unit 410 comprises microcontroller 412 operably connected to integrated circuit 413 and timing device 416. Integrated circuit 413 includes transmitter 414, receiver 415, audio matching circuit 442, chirp signal detector 444, chirp signal generator 446, control logic 450, and interface 454. The division of functionality, illustrated FIG. 8, among the integrated circuit 413, microcontroller 412, and the remaining components of sensing unit 410 is not required by any constraint and is provided to illustrate the operation and principles of the present invention.

As described above, a user activates sensing unit 410 by pressing button 418, which via control logic 450 powers up microcontroller 412. Upon such activation by a user, sensing unit 410 uses both active and passive frequency detection. In one embodiment, sensing unit 410 first stores a time value (see below) and then employs active frequency detection to determine the frequency to which a monitored broadcast receiver is tuned. If no frequency is detected in the active mode, sensing unit 410 sweeps the frequency spectrum in the passive mode described below. In one embodiment, sensing unit 410 is configured to store a plurality of carrier frequencies (usually the user's favorite or most-listened-to broadcast stations) and to start with these frequencies to detect a match before stepping through the entire frequency band in either the active or passive modes. Other variations are possible. For example, sensing unit 410 could employ passive frequency detection before relying on active frequency detection.

In one embodiment, sensing unit 410 includes two antennas (not shown) one of which is dedicated to signal transmission, while the other is dedicated to signal reception. In one embodiment, sensing unit includes a loop antenna for transmission, allowing for high transmission power accuracy and a dipole receive antenna which becomes more sensitive as the user holds the sensing unit (i.e., the user body's capacitance ads up with the antenna.)

a. Active Frequency Detection

In the embodiment of FIG. 8, active frequency detection operates similarly to the active frequency detection embodiment discussed above. Microcontroller 412 controls operation of transmitter 414 and chirp signal generator 446 to transmit a chirp signal to a monitored broadcast receiver. In one embodiment, chirp signal generator 446 transmits a chirp signal to transmitter 414. Microcontroller 412, in one embodiment, specifies the carrier frequency over which sensing unit 410 emits the chirp signal. Transmitter 414 modulates the carrier signal, specified by microcontroller 412, according to the chirp signal supplied by chirp signal generator 446. Sensing unit 410 broadcasts the modulated signal through antenna 430 via matching circuit 435, and transmit/receive switch 437, and band-pass filter 432. In one embodiment, chirp signal generator 446 is a Dual Tone Multiple Frequency (DTMF) generator that emits DTMF signals via transmitter 414 and antenna 430.

As described above, assuming the broadcast chirp signal has sufficient strength to overpower the broadcast signal to which the monitored receiver is tuned, the broadcast receiver demodulates the chirp signal and emits the broadcast chirp signal through a speaker. In one embodiment, sensing unit 410 is configured to delay for a predetermined amount of time in order to detect the chirp signal in the audio output of the broadcast receiver. Specifically, and in one embodiment, microphone 420 transduces the audio output of the monitored broadcast receiver, which allows chirp signal detector 444 to detect the chirp signal in the audio output. In one embodiment, chirp signal detector 446 is a DTMF signal detector. In one embodiment, a programmable gain control (PGC) circuit 438 amplifies the signal from microphone 420 to ensure an adequate signal level for detection of the chirp signal. If the chirp signal is detected, microcontroller 412 stores the corresponding frequency in association with a time value from timing device 416. The stored physical parameter data can be stored in memory integral to microcontroller 412 or, in another embodiment, in register bank 452. If the chirp signal is not detected, microcontroller 412 specifies another frequency and the process is repeated.

In one embodiment, sensing unit 410 adjusts the power of the chirp signal to a point just sufficient to overpower the broadcast signal to which the monitored receiver is tuned. In one embodiment, programmable gain control (PGC) circuit 439 ensures that the signal level going to receiver 415 is constant. In this form, microcontroller 412 monitors the gain value of PGC circuit 439 and uses the gain value to control the power of the chirp signal transmitted by transmitter 414.

As described above, microcontroller 412 steps through frequencies in the broadcast band until a match, if any, is detected. In one embodiment, microcontroller 412 attempts to detect a match on one to a plurality of preset broadcast frequencies. If no match is found, microcontroller 412 steps through all possible carrier frequencies in the broadcast band.

b. Passive Frequency Detection

In the embodiment of FIG. 8, the passive frequency detection mode in sensing unit 410 operates similarly to the passive frequency sensing unit discussed above. In one embodiment, microcontroller 412 specifies a carrier frequency to receiver 415, which demodulates the broadcast signal. Simultaneously, microphone 420 transduces the audio output of the monitored broadcast receiver. In one embodiment, PGC circuit 438 ensures a uniform signal level of the resulting signal. According to the embodiment shown, audio matching circuit 442 detects the correlation between the demodulated signal from receiver 415 and the audio output transduced by microphone 420. If audio matching circuit detects a sufficient correlation, microcontroller 412 stores the detected frequency and a time value from timing device 416. Otherwise, microcontroller 412 specifies a different carrier frequency. This process is repeated until either a sufficient correlation is detected or all possible carrier frequencies are exhausted.

Figure 9:
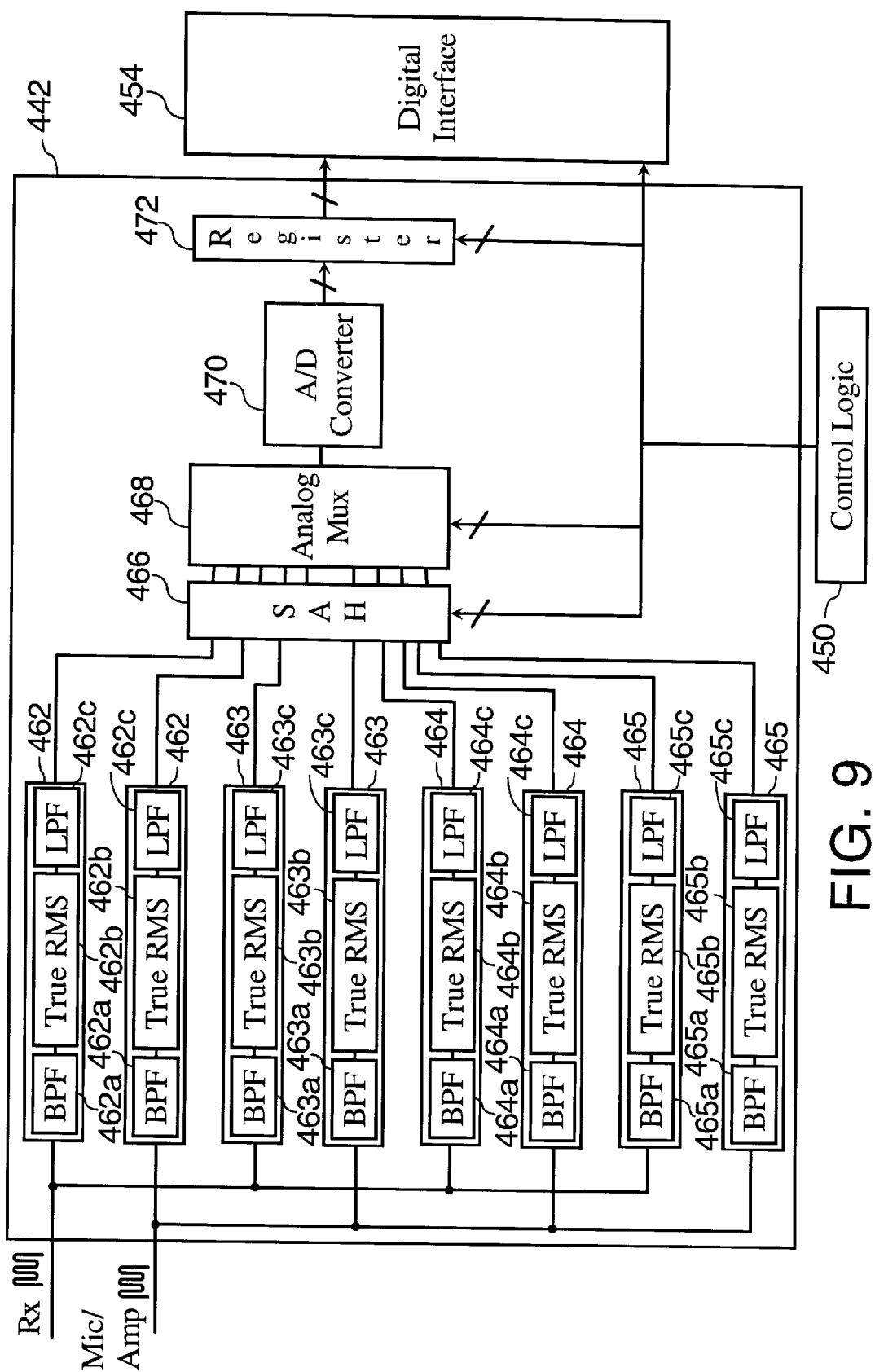
FIG. 9 is a functional block diagram illustrating an embodiment of the audio matching circuit for use in the fourth preferred embodiment of the present invention.

Several techniques can be used to match the demodulated signal from receiver 415 and the audio output signal transduced by microphone 420. Such techniques include, but are not limited to, (1) using Fast Fourier Transforms to compare the respective frequency spectrums of the signals, and (2) audio correlation methods in the time domain. One embodiment of sensing unit 410 takes advantage of a combination of frequency and time domain analysis to detect the correlation between the demodulated signal and the transduced audio output. FIG. 9 illustrates an audio matching circuit 442 configured according to this embodiment. Audio matching circuit 442, in this embodiment, comprises RMS filters 462, 463, 464, and 465, sample and hold circuit 466, analog multiplexer 468, analog-to-digital (A/D) converter 470, and register 472. The respective signals from receiver 415 and microphone 420/PGC circuit 438 (see FIG. 8) are filtered by RMS filters 462, 463, 464 and 465 to yield the power in each respective frequency band or "bin", which is determined by the central frequency and band of each band pass filter 462a, 463a, 464a and 465a. In one embodiment, RMS filter 462, for example, comprises band pass filter 462a, True RMS filter 462b, and low pass filter 462c. The number of RMS filters, however, merely depends on the amount of information required to correlate the signals. Accordingly, fewer or more RMS filters than that shown in FIG. 9 may be used. In the FM radio broadcasting context, the frequency spectrum of the signals from receiver 415 and microphone 420 typically ranges from about 50–3000 Hz (the audio band). Accordingly, in some embodiments, the central frequency of each band pass filter 462a, 463a, 464a and 465a lies between 10–3000 Hz. In some embodiments, the frequency range of the band pass filters can range from ±1% to ±100% of the audio band.

In one embodiment, sample and hold circuit 466 samples the analog values (i.e., the power in each band or "bin") of the respective signals from each RMS filter 462–465 and holds these values until A/D converter 470 has digitized them. Specifically and in one embodiment, starting at a first analog value, A/D converter 470 via analog multiplexer 468 digitizes the analog signal. The digital value of the signal is then held in register 472. Microcontroller 412 via digital interface 454 retrieves the digital value from register 472, causing the next analog value to be digitized by A/D converter 470. In one embodiment, this process is repeated until all analog signal values held by sample and hold circuit 466 are digitized and retrieved by microcontroller 412. In one embodiment, sample and hold circuit then samples and holds another set of analog values from band pass filters 462–465.

In one embodiment, microcontroller 412 stores the analog values for a sufficient number of time points and then detects a correlation in the data that characterizes the signals from receiver 415 and microphone 420. In one embodiment, data values for 3 and up to 10 time points are sampled to correlate the signals. In one embodiment, microcontroller 412 calculates the derivative of the RMS power for each bin. These derivative values corresponding to microphone 420 and receiver 415 are then compared to calculate a matching score. In one embodiment, the score for each bin is summed to compute an overall matching score for all bins.

In one embodiment, the rate of analog-to-digital conversion controls the sampling rate of the respective signals. In one embodiment, the sampling rate of A/D converter is configured to resolve the envelope of the filtered signals in order to reduce the amount of data to be processed and, thus, the cost of sensing unit 410. In one embodiment, the audio matching algorithm employed by microcontroller 412 samples the signals for a first number of time points and rejects frequencies where the correlation does not exceed a predetermined threshold. According to this embodiment, the remaining non-rejected frequencies are candidates for further inspection. In one embodiment, microcontroller 412 samples the signals at the non-rejected frequencies for a second number of time points exceeding the first number of time points.

In one embodiment, sensing unit 410 also compensates for background noise. In one form, sensing unit 410 via microphone 420 detects the noise of the surrounding environment and shifts the central frequencies of the band pass filters 462–465 away from frequencies where such noise has significant power or amplitude. In one embodiment, sensing unit 410 shifts the central frequencies of the band pass filters 462–465 to frequencies where the power or amplitude of the noise is at a minimum. In one such embodiment, the band pass filters include switch capacitors. Of course, any suitable component for adjusting the central frequencies of the band pass filters can be employed.

In another embodiment of the sensing unit of the present invention, the sensing unit includes a second receiver (not shown). In this embodiment, microcontroller 412 compares the correlation between the microphone input and a first receiver tuned to a first frequency and the correlation between the microphone input and a second receiver tuned to a second frequency and selects the frequency exhibiting the higher correlation. In one embodiment, this comparison is repeated by running a simple tournament among available stations/carrier frequencies to select the candidate or candidates that are accepted or rejected based on a longer correlation.

c. Timing Device

Timing device 416 provides a real-time or running time value which microcontroller 412 stores in association with a detected frequency when a user activates sensing unit 410. Timing device 416 can be a component physically separate from microcontroller 412 or can, at least in part, be integral to it. In one embodiment, timing device 416 is a real-time clock providing real-time information, such as date and time of day.

In another embodiment, timing device 416 provides running time information, as described below in section B.4, below. In one form of this embodiment, timing device 416 includes a timing mechanism, such as quartz watch crystal, and a counter operably connected thereto. In one embodiment, when a user activates sensing unit 410 to detect a frequency, microcontroller 412 copies the bits in the counter register to memory and clears the counter register. Microcontroller 412 then stores this time/counter value in association with the detected frequency. Accordingly, the counter register of timing device 416 is reset each time the user activates sensing unit 410. When the user activates sensing unit 410 to transmit the stored physical parameters, microcontroller 412 also copies the timer/counter value to memory and clears the counter register. According to this embodiment, therefore, sensing unit stores and transmits frequencies and timer/counter values corresponding to each frequency, as well as the timer counter value corresponding to the time interval spanning the last detected frequency and synchronization of sensing unit 410 (i.e., transmission of the stored physical parameter data to a second device, such as the user's computer or, directly, to a server according to the present invention).

The intervals of time corresponding to the binary numbers copied from the counter register can be resolved based on the oscillation frequency of the timing mechanism. In one embodiment, timing device 416 includes a standard quartz crystal oscillating at 32,768 Hz and a counter having a 64-bit register. In one form of this embodiment, microcontroller 412 copies and clears only the higher order bits in the counter register, since accuracy down to $1/32,768$th of a second, for example, is typically not required. In one embodiment, microcontroller copies and clears only the bits in the counter register necessary to resolve the time intervals to the nearest second.

In another embodiment, microcontroller 412 acts as a higher level timer. According to this embodiment, the oscillation crystal, as above, excites a counter. When the register of the counter overflows, the microcontroller wakes up and increases its counter register by 1. In one embodiment, the counter register and oscillation crystal of timing device are configure to overflow every second. Microcontroller 412, therefore, maintains a count of the number of seconds between activation of sensing unit 410 by the user.

d. Communication of Stored Physical Parameter Data

In the embodiment of FIG. 8, communication of stored physical parameter data is wireless. In one embodiment, a short depression of button 418 causes sensing unit to detect and store the frequency to which a monitored broadcast receiver is tuned. On the other hand, a long depression of button 418 causes sensing unit 410 to transmit stored physical parameter data. In one form, chirp signal generator 446 emits a signal representative of the stored physical parameter data. In one form of this embodiment, sensing unit 410 also transmits a signal representative of the user's unique identification number. In one embodiment, amplifier 440 amplifies the resulting signal before it is transduced by speaker 426.

In one embodiment, chirp signal generator 446 is a DTMF generator. Accordingly, in one embodiment, a user can position sensing unit 410 next to a phone headset and communicate the stored physical parameter data and/or unique identification number over the phone lines to a server according to the present invention. In another form, sensing unit 410 can also store and transmit a signal representative of the phone number to achieve a dial-up connection to the server. In another embodiment, the user's computer is configured to recognize the DTMF signal and resolve the transmitted physical parameter data. Once in the user's computer, the user can access a server and retrieve data locations corresponding to the observed physical parameter data. In another embodiment, sensing unit 410 can be physically connected to a user's computer and transmit stored physical parameter data.

One embodiment of sensing unit 410 employs the use of a circular buffer memory to facilitate one-way communication. According to one embodiment, sensing unit 410 does not erase physical parameter data from memory after transmission to either client computer 60 or data location site 50 (see FIG. 6). Rather, and in one embodiment, the oldest data in the circular buffer memory is overwritten. In one form, when a user activates sensing unit 410 to detect and store physical parameter data, microcontroller 412 writes physical parameter data to the next available location in memory. When microcontroller 412 writes to the last location in memory, it begins at the first memory location and overwrites the physical parameter data previously stored. According to one embodiment, when a user activates sensing unit 410 to transmit the stored physical parameter data, sensing unit 410 transmits the physical parameter data stored in memory. Sensing unit 410, in one embodiment, does not clear the memory after upload, however, because the sensing unit cannot receive confirmation of a successful upload. The user, however, does know if the upload is successful via feed back from data location site 50. In case there is a problem uploading the physical parameter data, the user is prompted to try again. In one embodiment, sensing unit 410 transmits all physical parameter data stored in the memory. According to one form of this embodiment, server 52 is configured to recognize and reject previously uploaded physical parameter data. In another embodiment, sensing unit 410 transmits only the physical parameter data that was not previously uploaded.

4. Storage of Time Intervals

As discussed above, in one embodiment of the present invention, the sensing units of the present invention sense and store running time values or time intervals rather than real-time values. The use and storage of running time values in sensing units according to one embodiment of the present invention allows use of less expensive timing components, since any drift can be detected and corrected (see below). In addition, the use of running time values further allows for one-way communication between the sensing unit and the data location site, since the timing device in the sensing unit merely needs to be reset and requires no synchronization with a remote real-time clock. This embodiment, therefore, further reduces the complexity and cost of the sensing unit.

Figure 10:
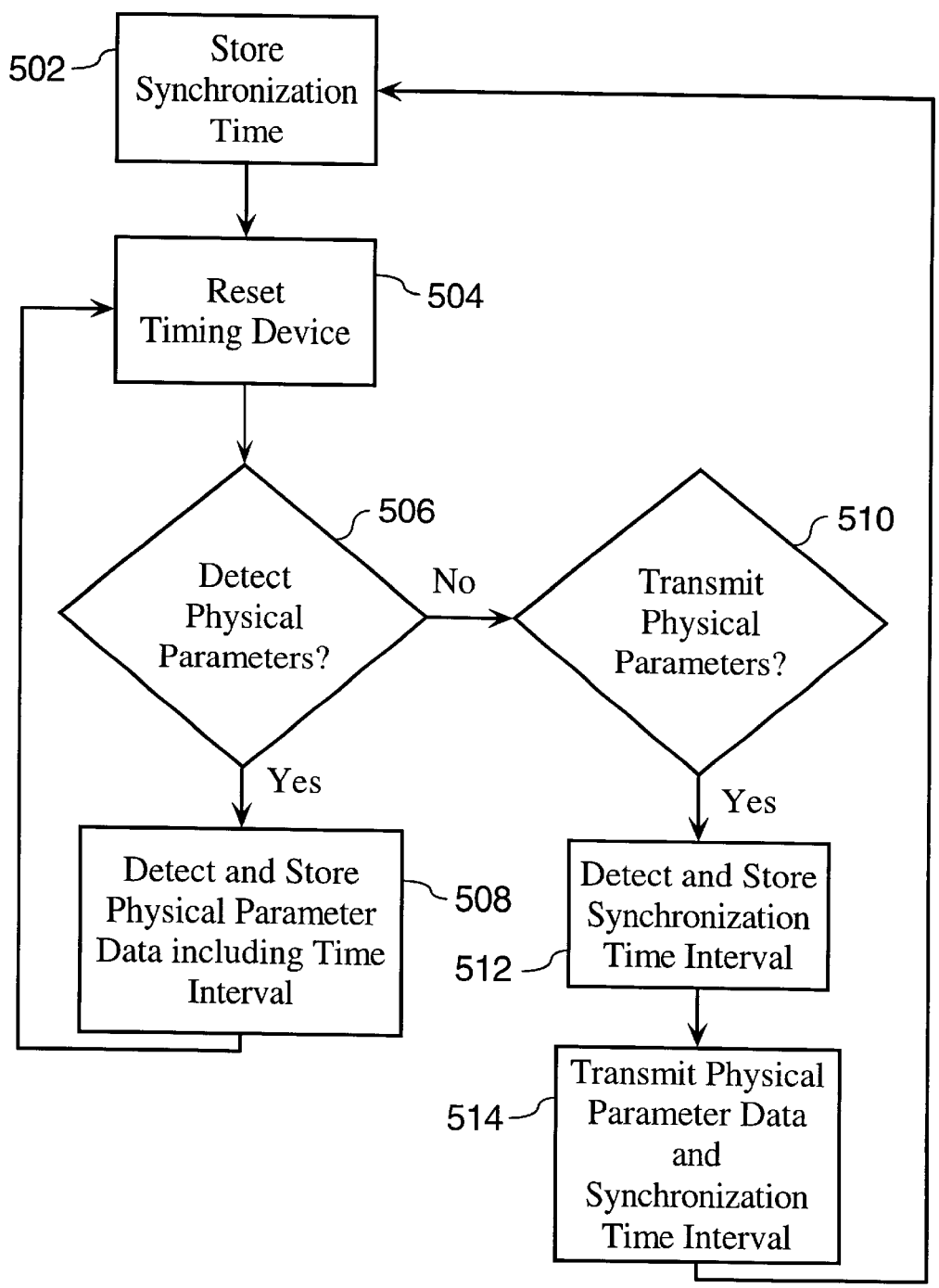
FIG. 10 is a flow chart setting forth a method for storing physical parameter data according to one embodiment of the present invention.
Figure 11:
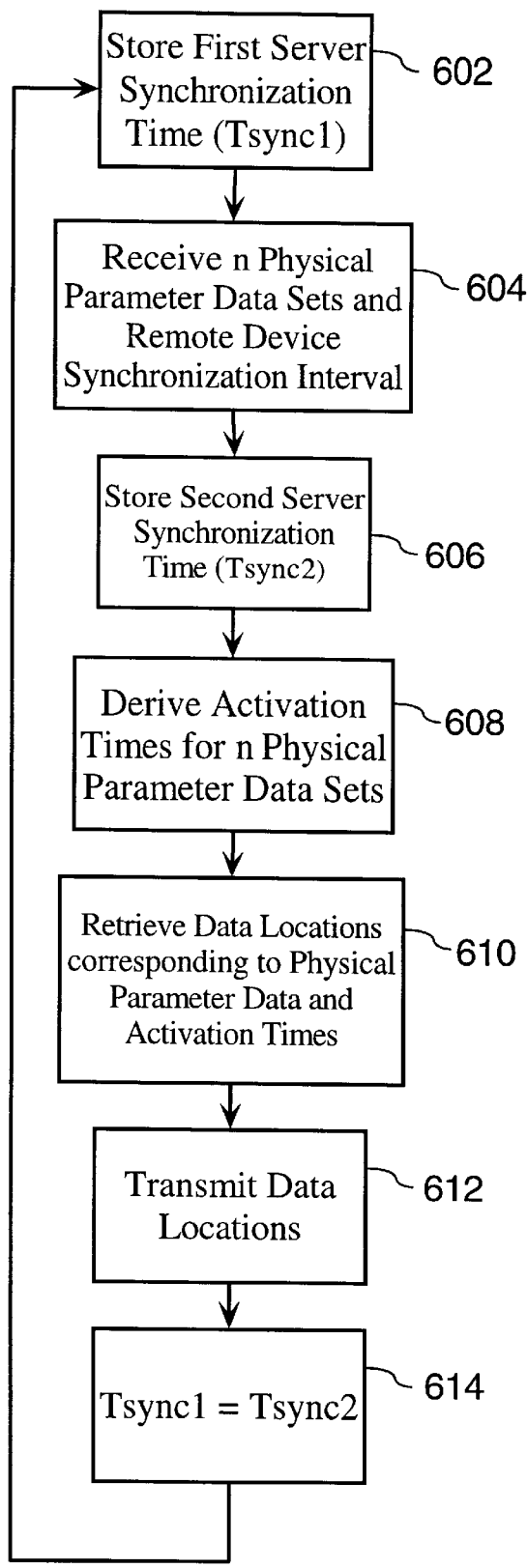
FIG. 11 is a flow chart diagram illustrating a method for receiving physical parameter data that includes running time intervals.
Figure 12:
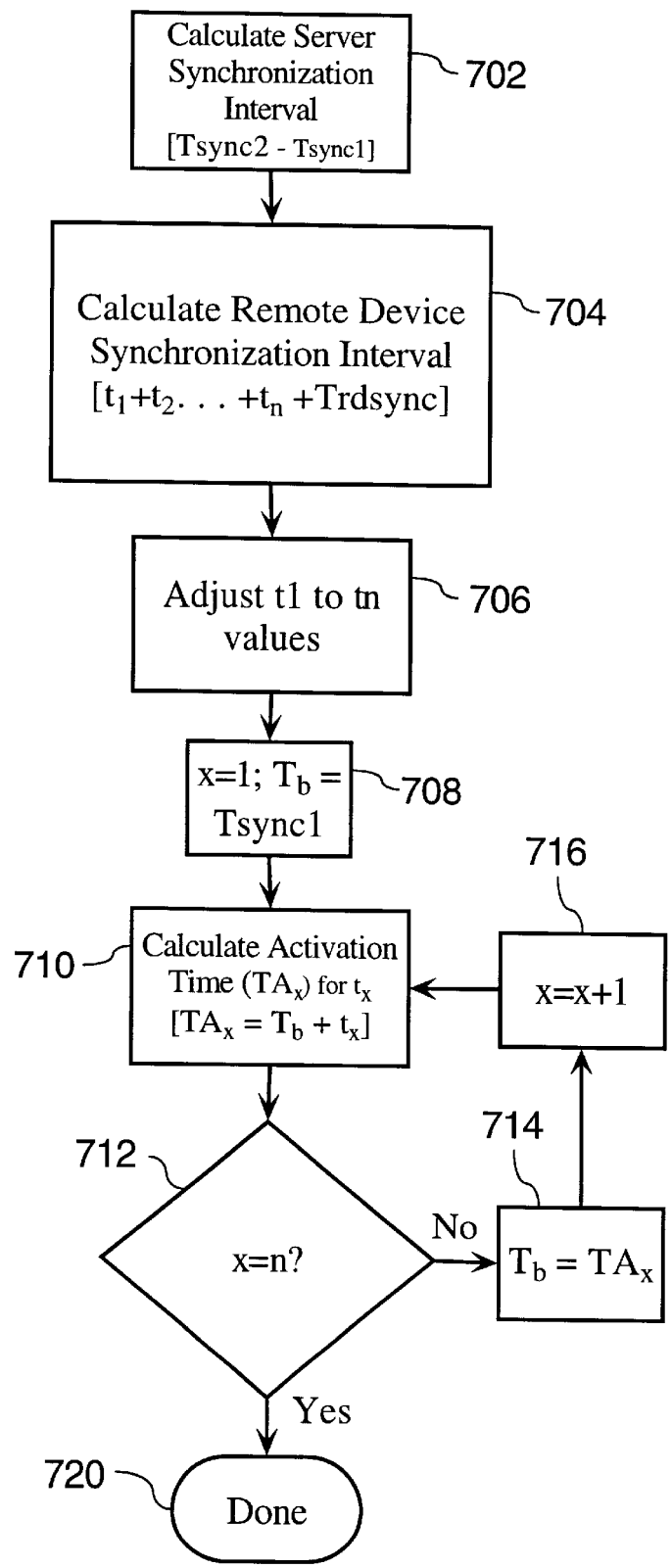
FIG. 12 is a flow chart diagram providing a method for resolving activation times in real-time from physical parameter data including running time intervals.

FIGS. 10, 11 and 12 illustrate methods for use in one embodiment of the present invention. FIG. 10 sets forth a method for detecting and storing physical parameter data including time values associated with the activation of the sensing unit and the synchronization of the sensing unit with the server or data location site of the present invention. In one embodiment, when sensing unit 70 is synchronized, data location site 50 records a first server synchronization time (Tsync1, which, in one embodiment, is the time and date of the synchronization) (FIG. 10, step 502; FIG. 11, step 602). In one embodiment, server 52 records the synchronization time in user account database 56 in association with the corresponding user or sensing unit identification. In one embodiment, server synchronization times are based on a standard real-time clock or other timing device. In one embodiment, the synchronization of the sensing unit occurs when the user activates the sensing unit to transmit physical parameter data to data location site 50.

In one embodiment, when a user synchronizes sensing unit 70 with data location site 50, the timing device in sensing unit 70 is reset or initialized (FIG. 10, step 504). After such initialization, the timing device in sensing unit 70 starts to run. When a user activates sensing unit 70 to detect and store physical parameter data (FIG. 10, step 506), sensing unit detects and stores the physical parameter data including the running time value, $t_1$, of the timing device (step 508). Accordingly, sensing unit 70 stores the time value interval between synchronization and first activation of sensing unit 70. In one embodiment, the time value provided by the timing device corresponds to a second in time. In another embodiment, the time value is merely the number of oscillations of the timing mechanism, such as a quartz crystal. As discussed above, the actual time value can be resolved by multiplying the oscillation frequency of the timing mechanism with the number of oscillations recorded by the sensing unit.

In the embodiment shown, after sensing unit 70 records the physical parameter data, sensing unit 70 resets the timing device (step 504) and waits for another activation by the user. If the user activates sensing unit 70 to detect and record physical parameter data, sensing unit again records a time value, $t_2$, provided by the timing device. Accordingly, the time value associated with the second physical parameter data set indicates the time interval between the first and second activations by the user. A user may detect and record physical parameter data up to the limits of the memory in sensing unit 70. In one embodiment, when the memory of sensing unit 70 is full, sensing unit 70 warns the user by emitting a beep or other tone. When the user activates sensing unit 70 to transmit physical parameter data (FIG. 10, step 510), sensing unit 70 detects and stores the time value (Trdsync) provided by the timing device (step 512). Sensing unit 70 then transmits the physical parameter data stored in memory and Trdsync to data location site 50 (step 514), either directly or via client computer 60.

FIGS. 11 and 12 illustrate methods for receiving the physical parameter data sets transmitted by sensing unit 70, resolving activation times associated with the physical parameter data sets, and returning data locations relating to such physical parameter data. As discussed above, when the user synchronizes sensing unit 70 to transmit physical parameter data, server 52, in one embodiment, receives and stores the physical parameter data sets and the last-activation-to-synchronization interval, Trdsync (FIG. 11, step 604) and stores a second server synchronization time, Tsync2 (step 606). Server 52 then derives activation times (date and time, in one embodiment) for the n number of physical parameter data sets (step 608) to allow for retrieval of data locations corresponding to the physical parameter data and activation times (step 610). In the embodiment shown, server 52 transmits the data locations, if any, to the user (step 612) and stores the second server synchronization time, Tsync2, as the first server synchronization time, Tsync1, in association with the user's account (steps 614 and 602). FIG. 12 sets forth a method for deriving activation times. However, other methods can also be used. For example, server 52 can calculate the activation times by using Trdsync and the other time intervals and count back from Tsync2. According to this embodiment, server 52 need not store a Tsync1 value, if no error or clock correction is desired.

FIG. 12 sets forth a method for deriving activation times from the physical parameter data transmitted from sensing unit 70. In one embodiment, server 52 corrects the time values transmitted by sensing unit 70. Specifically and in one embodiment, server 52 first calculates the server synchronization interval (Tsync2-Tsync1), which is the interval of time relative to the real-time clock used by data location site between synchronizations of sensing unit 70 (FIG. 12, step 702). In one embodiment, server 52 also calculates a remote device synchronization interval by summing the time intervals ($t_1$ thru $t_n$) and the last-activation-to-synchronization interval, Trdsync, transmitted by sensing unit 70 (step 704). Server 52 then adjusts $t_1$ thru $t_n$ based on the difference, if any, between the server synchronization interval and the remote device synchronization interval (step 706). In one embodiment, interpolation is used to adjust the running time values, $t_1$ thru $t_n$.

Whether the running time values, $t_1$ thru $t_n$, have been adjusted or not, server 52 then calculates activations times for each physical parameter data set. Starting at the first physical parameter data set, a base line time, $T_b$, is set to the first server synchronization time, Tsync1, corresponding to the particular sensing unit 70 (FIG. 12, step 708). The activation time ($TA_1$) for the first physical parameter data set is calculated by adding the running time interval, $t_1$, to the base time value, $T_b$ (step 710). The base time, $T_b$, is then stepped up by the previous running time interval, $t_1$ (step 714). This process is repeated for all physical parameter data sets transmitted during synchronization of sensing unit 70 (steps 712, 714, 716 and 720). These activations times can then be used with the physical parameter data transmitted by sensing unit to retrieve data locations, as described above.

5. Resolving Geographic Location from Frequency Spectrum Signature of Broadcast Band Embodiments of the frequency sensing unit of the present invention detect geographic location based on the unique signature of the frequency spectrum of the broadcast band. For example, the FM radio broadcast band spans from 88 to 108 MHz. Spacing of the carrier frequencies allows for up to 100 different FM broadcast stations in a given geographic or broadcast region. A typical market area, however, has only about ten to fifteen broadcast stations, while a large market may have up to about 30 to 35 broadcast stations. Moreover, the broadcast transmitters of a particular market are spaced throughout the region and broadcast signals of varying strength. Accordingly, these various factors often yield a unique frequency spectrum signature for the broadcast band of each geographic region and locations within each region.

In one embodiment, sensing unit 410 scans the broadcast frequency band to detect the frequency spectrum signature. In one embodiment, sensing unit 410 detects a 1-bit level frequency spectrum signature in that, if a signal of at least a threshold level is detected at a particular frequency, microcontroller 412 stores a value of "1" for that carrier frequency. If no above-threshold signal is detected, microcontroller 412 stores a "0" value. In one form of this embodiment, microcontroller 412 stores the frequency spectrum signature as a string of bits where each bit represents a carrier frequency. In one such embodiment, the first bit in the string corresponds to the lowest carrier frequency in the broadcast band, and the last bit to the highest carrier frequency.

In one embodiment, when a user activates sensing unit 410 to store physical parameter data associated with the operation of a broadcast receiver, sensing unit stores the detected frequency, a time value, and the signature of the broadcast band. According to this embodiment, physical parameter/data location database 54 stores the corresponding broadcast band signatures corresponding to the broadcast station logs stored in the database. When a user transmits physical parameter data by activating sensing unit 410, server 52 scans database 54 according to broadcast band signature, frequency and activation time to retrieve a corresponding data location.

In another embodiment, sensing unit 410 detects the relative strength of the signal corresponding to each carrier frequency and stores a multiple-bit value for the power/amplitude of the signal at each carrier frequency. Since the locations of the various broadcast transmitters in a particular geographic broadcast region are known, this embodiment therefore allows for detection of the user's location within each general geographic region based on triangulation concepts known in the art. In one embodiment, physical parameter/data location database 54 stores a plurality of broadcast band signatures corresponding to different locations within each broadcast region. According to this embodiment, the broadcast band signatures corresponding to different locations have been detected and recorded in advance and stored in database 54. Therefore, a user's location within a broadcast region can be resolved by comparing known signatures in that region to the signature detected by the user's sensing unit.

In another embodiment, geographic location is determined by reference to an Radio Data System (RDS) signal specific to the broadcast region. In one embodiment, a broadcast station in a particular region is configure to broadcast a predetermined RDS signal in a side band of the broadcast signal. According to one embodiment, the sensing unit is configured scan the broadcast band and detect the predetermined RDS signal. In one form, the identity of the carrier frequency at which the RDS signal was detected indicates the particular geographic region. In another embodiment, the RDS signal includes information relating to the broadcast region. In this form, the sensing unit is configured to tune to a predetermined carrier frequency and resolve the RDS signal to determine the user's geographic location.

C. Other Physical Parameter Sensing Units

Figure 4:
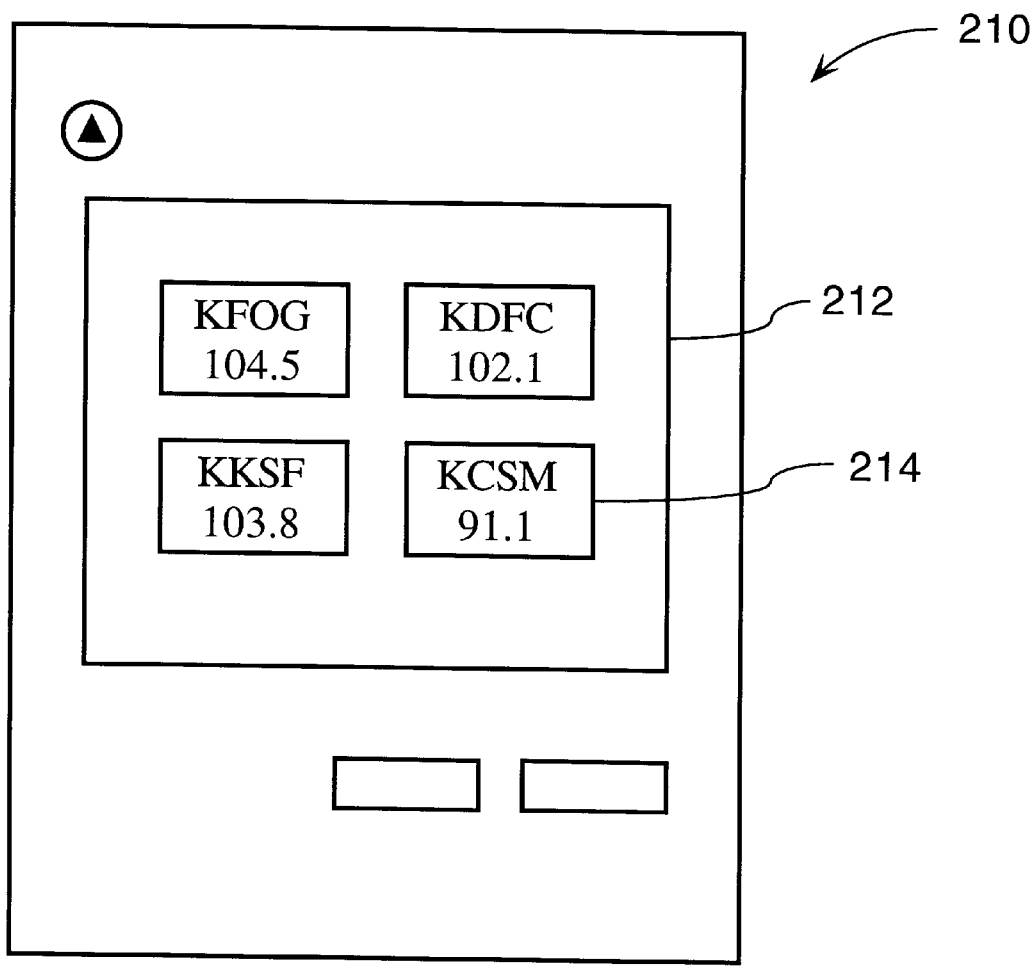
FIG. 4 is a front plan view of a hand-held computer which has been configured according to the present invention.

Other embodiments of the sensing unit depend on the listener to specify the frequency of the broadcast. FIG. 4 illustrates one such embodiment in the form of a common hand-held computer 210 having a touch-activated screen 212. According to the invention, hand-held computer is programmed to display buttons 214 on screen 212. Buttons 214 correspond to the particular listener's preferred radio stations. When the listener desires more information about a particular broadcast, she simply touches the pre-programmed buttons 214 corresponding to the radio station to which the radio receiver is tuned. Hand-held computer 210 is programmed to store the radio station selected and the time it was selected. The listener synchronizes hand-held computer 210 with a standard notebook or desktop computer by any suitable means or uses hand-held computer 210 to communicate directly with the server of the present invention.

Yet another embodiment of the sensing unit of the present invention includes a software application activated by a button on the task bar of a typical graphical user interface on the listener's computer. This embodiment has especial application in the context of Internet audio and video streams, where the listener is typically at or near her computer. In a preferred embodiment, when the listener clicks on the button on the task bar, the task bar application presents the listener with a list of stations in a pop-up menu. The application stores the selected broadcast station and the time for subsequent transmission to the database.

Lastly, the listener may use the telephone to communicate observed physical parameters directly to the server of the present invention. In this embodiment, the listener notes the frequency of the broadcast and telephones the server. In one embodiment, a hand-held device including a bar code reader is configured to scan a sheet of paper having bar codes corresponding to different radio and/or television broadcast stations. To The server prompts the listener for the frequency and the time of the observation. The server may use the time of the phone call as a default time value, unless otherwise specified by the listener. Additionally, the server may prompt the listener for the location of the observation or trace the location of the call through conventional means, if possible.

As discussed above, the database for use with physical parameters identifying radio broadcasts associates the physical parameters of frequency and time with data locations or URLs. In addition, a database that includes information relating to more than one geographic area may also include the broadcast area as an additional physical parameter. The broadcast area parameter could be provided by the listener after transmission of the observed physical parameters. Similarly, the broadcast area could be a default value based upon the listener's profile or membership information. In addition, the sensing unit may include a global positioning (CPS) unit providing the listener's geographic location when the user activates the sensing unit.

To construct the database for a particular geographic area, the play lists of participating or desired radio stations must be obtained. A typical play list includes the song title, artist, and a starting time. A play list may also include information relating to the broadcast or advertising. The play list data is used to associate data locations with the physical parameters of time and frequency. For example, a hypothetical musical group named "RockBand" may have a web site denoted by the URL, http://www.rockband.com/. A playlist from a particular radio station, broadcasting over the 102.1 megahertz carrier frequency, reveals that RockBand's latest song will play on May 30, 1999 at 13:05:32 (hh:mm:ss). According to the invention, the data location "http://www.rockband.com/" will be associated with the frequency of 102.1 megahertz and the time of May 30, 1999 at 13:05:32. In one preferred embodiment, a record will be created that includes the frequency of the broadcast, the start time of the song, the name of the song and artist, and the associated data location or URL. As discussed above, this record may also include the geographic area of the broadcast station.

According to the invention, a server receives queries from a client computer over a computer network or a direct dial-up connection and scans the database of the present invention for data locations corresponding to received physical parameters. The server of the present invention may be implemented in hardware or software, or preferably a combination of both. In preferred form, the server is implemented in computer programs executing on programmable computers each comprising at least one processor, a data storage system (including volatile and non-volatile media), at least one input device, and at least one output device. In addition, the server of the present invention may also store the results of each query to develop user profiles and other statistical data for subsequent use.

Additionally, other physical parameters may be employed in the radio broadcasting context according to the present invention. In one preferred embodiment, the physical parameter includes an audio signature or "watermark" embedded in the digital recording data. The sensing unit of this embodiment is programmed to sense the watermark particular to a song or advertisement. The sensing unit stores the watermark upon activation of the unit by the listener. The watermark comprises a unique identification number. According to this embodiment, the server includes records having the unique identification number and at least one corresponding data location or URL. Accordingly, a query that contains an identification number will return an associated data location.

D. Application of Present Invention to Other Contexts

Television Broadcasting

Another application of the present invention lies in television broadcasting. According to the invention, the server is configured similarly to that discussed above in the radio broadcasting context. Each data location has corresponding physical parameters of time and channel frequency. Additional physical parameters may also include broadcast location. The sensing units and methods discussed above may be used in the television broadcasting context. Of course, application to television broadcasts requires changing the range of frequencies in which such sensing units operate.

In another embodiment, the sensing unit for use with television broadcasting may be incorporated into the remote control unit of the user's television. In one embodiment, the sensing unit stores the currently viewed television channel in a buffer and includes a real-time clock. When the user presses a button on the remote control that activates the sensing unit, the television channel and the signal from the clock are stored in memory. In one embodiment, these stored physical parameters may be transmitted from the remote unit to a computer equipped with an infrared device.

Concert Poster and Other Bar Codes

Another embodiment of the present invention includes the use of bar codes or other graphical patterns to convey information. Accordingly, the observed bar codes or other graphical patterns are the physical parameters observed by a sensing unit and communicated to the server of the present invention. The sensing unit of one preferred embodiment includes a standard bar code reader and a means for storing the data captured by the bar code reader.

By way of example, a concert promoter typically advertises a particular concert by, among other things, displaying posters in a particular area. According to the invention, a bar code or other graphical representation is provided on the poster. If the reader of the poster desires to find a web site with ticket ordering or other information about the concert, he swipes the bar code reader of the sensing unit over the bar code provided on the poster. In one preferred embodiment, the bar code, when read, provides a unique identification number, which the sensing unit stores in memory. When the user has access to a computer, the identification number is transmitted to the server of the present invention, which returns the associated data location or URL.

As one can imagine, bar codes may appear in myriad locations. A vendor could include a bar code in several locations at a trade show booth. An advertiser can include a bar code in a print advertisement in newspaper, magazines, or other print media. Furthermore, many products already include bar codes expressing UPC information. This UPC information could similarly be associated with a data location pointing to the product manufacturers web site. In another embodiment, a retail store can include bar codes on price tags or stickers. A customer can walk through the retail store show room and scan the bar codes on the price tags using the sensing unit discussed above. Later, when the customer has returned to her home, she may transmit these stored physical parameters to her home computer and access the server of the present invention. The server returns the data location corresponding to the retail store's web site and a list of the items scanned by the customer. The customer uses this list to order these products on the retail store's web site.

In yet another embodiment, the retail store price tag may include UPC information and a vendor identification number. The server of this embodiment returns the data location of the product manufacturer's or distributor's web site to the customer based on the product number. When the customer orders the product through this web site, the vendor identification number is also transmitted. This allows, for example, the retail store to receive a commission on the sale.

Real World Images

In another embodiment, the physical parameters are actual images captured in the physical world. One such image for example, could be a car manufacturer's logo or emblem. The sensing unit of this embodiment includes a digital camera that captures and stores images in digital form. A user seeing a car that is of interest simply points the digital camera at the emblem appearing on the hood and captures the image. The server according to the invention compares the image captured by the digital camera with digital images stored in its database. If a matching image is located, the server returns the associated data location, which in this instance could be the car manufacturers web site, a local dealer's web site, or both.

Business Card Link

Other embodiments of the present invention contemplate the exchange of physical parameters between sensing units. The sensing units of one preferred embodiment store an identification number that is unique to a particular individual or business entity and have the capability of transmitting this identification number by means of an infrared or sound transmitter. The sensing units of this embodiment also include the ability to read and store the identification number transmitted by other sensing units. For example and in a preferred embodiment, each sensing unit includes an activator button. To exchange identification numbers, the sensing units are pointed at one another and the buttons depressed causing an exchange of identification numbers. Thus, in this instance, the observed physical parameters are infrared or sonic signals expressing an identification number. In one embodiment, the physical parameter data could be transmitted using the DTMF generator of the sensing unit shown in FIG. 8 or at radio frequencies using the transmitter.

The server of the present invention stores an association between these identification numbers and corresponding data locations or URLs. In this manner, two people can exchange links to each others contact information. This information exchange is dynamic in the sense that, rather than exchanging the information itself, which may change over time, links to information or data locations are exchanged. Therefore, while the link or data location remains the same, the information corresponding to the data location may be constantly refreshed.

Yet another embodiment features a retail store equipped with a radio beacon that transmits infrared or sonic signals expressing an identification number. When a customer is in the retail store, the user may activate the sensing unit to sense the signal and store the retail store's identification number. As above, the customer later transmits the identification number to the server of the present invention to retrieve a data location corresponding to that retail store.

Sightseer/Tourist Example-GPS System

Geographic location may be the primary physical parameter in a server designed to assist sightseers and tourists. The sensing unit in this circumstance may comprise a hand-held or other portable computer equipped with a GPS unit. The user activates the sensing unit such that it records the geographic location provided by the GPS unit. Of course, any suitable device for sensing geographic location may be used, including but not limited to radio-based systems, such as LORAN®, or other satellite receiver navigation systems. The user can also enter into the hand-held computer such search terms as "restaurant," "dining," or "museums" and even a geographic radius within which information is desired. The hand-held computer can then transmit the observed geographic location together with other user-specified information to the server of the present invention by any conventional means. The server then retrieves data locations or URLs corresponding to the observed geographic location and the search terms entered by the user. In a preferred embodiment, the hand-held computer may include an Internet browser such that the user can access the desired information immediately subsequent to receiving the data locations from the server.

Movie Theater

In another preferred embodiment of the present invention, the observed physical parameter is an audio signature embedded in the audio track of a movie preview. The sensing unit of the present invention is configured to recognize the audio signature and store it in memory upon activation by the user. Therefore, when the user desires more information about the movie being previewed, he simply activates the device during the movie preview to store the audio signature. The server of the present invention in response to a data location request containing such audio signature returns the data location corresponding to that particular movie. The web site itself offers, for example, advance ticket sales, a sound track of the movie on CD play times, promotional items, theater locations, and reviews.

SUMMARY

With respect to the above-provided description, one skilled in the art will readily recognize that the present invention has application in a variety of contexts. The foregoing description illustrates the principles of the present invention and provides examples of its implementation. Accordingly, the description is not intended to limit the scope of the claims to the exact embodiments shown and described.

What is claimed is:

1. A method for sensing physical parameter and retrieving data locations relating to the physical parameter data, the method comprising the steps of:

(a) initializing a clock in a first device and storing a first synchronization time in a second device;

(b) upon activation by a user, storing in the first device physical parameter data including the interval of time between the first synchronization time and the activation by the user;

(c) upon each subsequent activation by a user, storing in the first device corresponding physical parameter data including the interval of time between activations;

(d) transmitting, upon activation of the user, the intervals of time and the corresponding physical parameter data stored in steps (b) and (c) to the second device;

(e) receiving from the second device supplemental information related to the intervals of time and other physical parameter data transmitted in step (d);

(f1) storing the interval of time between the last activation of the user in step (c) and the activation in step (d); and (f2) transmitting the interval of time stored in step (f1) to the second device.

2. The method of claim 1 wherein said physical parameter data comprises the frequency to which a broadcast receiver is tuned.

3. The method of claim 1 wherein said supplemental information receiving in step (e) comprises a data location relating to said physical parameter data.

4. A method for sensing physical parameter and retrieving data locations relating to the physical parameter data, the method comprising the steps of:

(a) upon activation by a user, storing in a first device physical parameter data including the interval of time between a first synchronization of the first device with a second device and the activation by the user;

(b) upon each subsequent activation by a user, storing in the first device corresponding physical parameter data including the interval of time between activations;

(c) transmitting, upon activation of the user, the intervals of time and the corresponding physical parameter data stored in steps (a) and (b) to the second device;

(d) receiving from the second device supplemental information related to the intervals of time and other physical parameter data transmitted in step (c);

(e1) storing the interval of time between the last activation of the user in step (b) and the activation in step (c); and (e2) transmitting the interval of time stored in step (e1) to the second device.

5. A method for providing supplemental information based on remote sensing of physical parameter data, said method comprising the steps of:

(a) recording a first server synchronization time;

(b) receiving at least one physical parameter data set and a remote device synchronization time interval, said physical parameter data set including a first physical parameter and a corresponding time interval;

(c) recording a second server synchronization time;

(d) deriving activation times corresponding to each physical parameter data set received in step (b) based on the time intervals in the physical parameter data sets, the first and second synchronization times, and the synchronization time interval received in step (b); and (e) scanning a database to retrieve supplemental information related to the activation times derived in step (d) and the first physical parameters received in step (b).

6. The method of claim 5 wherein said deriving step (d) comprises the steps of:

(d1) calculating a server synchronization interval based on the first and second server synchronization times;

(d2) calculating a remote device synchronization interval based on the time intervals in the physical parameter data sets and the remote device synchronization time interval;

(d3) correcting the time intervals corresponding to each physical parameter data set based on the difference between the server synchronization interval and the remote device synchronization interval;

(d4) calculating the activation times corresponding to each physical parameter data set by adding the corresponding corrected time interval to the first server synchronization time.

7. The method of claim 6 wherein said correcting step (d3) is based on interpolation.

8. The method of claim 5, 6 or 7 wherein the physical parameter data comprises the frequency to which a broadcast receiver is tuned, and wherein the time interval corresponds to the interval of time between activations of a first device for storing the frequency.

* * * * *